United States Patent
Tomaru

(10) Patent No.: US 10,318,607 B2
(45) Date of Patent: Jun. 11, 2019

(54) COMPUTER AND COMPUTING PROGRAM

(71) Applicant: Hitachi, Ltd., Chiyoda-ku, Tokyo (JP)

(72) Inventor: Tatsuya Tomaru, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 24 days.

(21) Appl. No.: 15/561,566

(22) PCT Filed: Mar. 27, 2015

(86) PCT No.: PCT/JP2015/059765
§ 371 (c)(1),
(2) Date: Sep. 26, 2017

(87) PCT Pub. No.: WO2016/157333
PCT Pub. Date: Oct. 6, 2016

(65) Prior Publication Data
US 2018/0089144 A1    Mar. 29, 2018

(51) Int. Cl.
*G06F 17/11* (2006.01)
*G06N 5/00* (2006.01)
*G06N 10/00* (2019.01)

(52) U.S. Cl.
CPC .............. *G06F 17/11* (2013.01); *G06N 5/003* (2013.01); *G06N 10/00* (2019.01)

(58) Field of Classification Search
CPC ................................ G06F 17/11; G06N 5/003
USPC .......................................................... 708/446
See application file for complete search history.

(56) References Cited

U.S. PATENT DOCUMENTS

| 7,788,192 B2 | 8/2010 | Amin | |
| 2007/0180586 A1 | 8/2007 | Amin | |
| 2015/0278408 A1* | 10/2015 | Yoshimura | G06F 17/5009 703/2 |
| 2018/0225256 A1* | 8/2018 | Ronnow | G06F 17/11 |

FOREIGN PATENT DOCUMENTS

JP    2009-524857 A    7/2009

OTHER PUBLICATIONS

International Search Report (PCT/ISA/210) issued in PCT Application No. PCT/JP2015/059765 dated Jun. 30, 2015 with English translation (Two (2) pages).

(Continued)

*Primary Examiner* — Tan V Mai
(74) *Attorney, Agent, or Firm* — Crowell & Moring LLP

(57) ABSTRACT

Provided is a computer that does not need quantum coherence or a cryogenic cooling device for a problem to be solved that needs an exhaustive search and a computing program thereof. Spin sj as a variable is caused to follow a local effective magnetic field Bj to introduce a system to a ground state of a problem-setting system. The ground state is a solution. At t=0, the magnetic field Bj is applied in the x-axis direction at all sites and all spins sj are initialized to the x-axis direction. With the lapse of time t, a magnetic field in the z-axis direction and interspin interaction are gradually applied, spin becomes +z-direction or −z-direction finally, and the z-component of spin sj becomes sjz=+1 or −1. When the direction spin sj is caused to follow the direction of the effective magnetic field Bj, a relaxation term to keep the direction of spin sj is introduced to improve convergence of a solution.

15 Claims, 22 Drawing Sheets

(56) References Cited

OTHER PUBLICATIONS

Japanese-language Written Opinion (PCT/ISA/237) issued in PCT Application No. PCT/JP2015/059765 dated Jun. 30, 2015 (Three (3) pages).
Farhi, E., et al., "A Quantum Adiabatic Evolution Algorithm Applied to Random Instances of an NP-Complete Problem," Science, vol. 292, Apr. 20, 2001, pp. 472-476 (Five (5) pages).
Perdomo-Ortiz, A., et al. "Finding Low-Energy Conformations of Lattice Protein Models by Quantum Annealing," Scientific Reports, vol. 2, No. 571, Aug. 13, 2012, pp. 1-7 (Seven (7) pages).
Barahona, F., "On the Computational Complexity of Ising Spin Glass Models," J. Phys. A: Math. Gen. 15, 1982, The Institute of Physics, pp. 3241-3253 (Thirteen (13) pages).

\* cited by examiner

COMPUTER AND COMPUTING PROGRAM

TECHNICAL FIELD

The present invention relates to a computer which enables a high-speed computation for an inverse problem or a combinatorial optimization problem requiring an exhaustive search.

BACKGROUND ART

As represented by words such as big data, the present age is full of data. In information science, knowing how to analyze huge data and how to handle becomes one of the most important problems to be solved. Big data has many problems that need a complex analysis. For example, when a certain result is obtained, it may be desired to find cause of the result. This is referred to as an inverse problem. It becomes difficult to find the cause as a phenomenon becomes more complicated, and in general, efficient algorithm for obtaining an initial value from a result is not present. In the worst case, the exhaustive search should be conducted for the initial value. This is one of the difficult problems in big data. Alternatively, there are also many problems to select an optimal solution from among many choices on the basis of big data. Also, in this case, when all possibilities are taken into account, a need for the exhaustive search comes out. From this background, a computer which efficiently solves a problem which needs the exhaustive search is needed.

On the exhaustive search problem, expectations for a quantum computer are large. The quantum computer simultaneously realizes "0" and "1", each of which is composed of a basic element called a quantum bit. For that reason, the quantum computer has a potential to simultaneously calculate all solution candidates as the initial value and certainly realize the exhaustive search. However, the quantum computer needs to maintain quantum coherence over the entire calculation time and there appears no prospect that this is realized.

In this situation, a method that has come to be noted is called adiabatic quantum computing (NPL 1). This method is one in which a problem is converted such that a ground state of a certain physical system becomes a solution and the solution is obtained by finding the ground state. The Hamiltonian of a physical system for which a problem is set is assumed as $\hat{H}_p$. However, the Hamiltonian is not assumed as $\hat{H}_p$ at a time point of starting computation and is assumed as another Hamiltonian $\hat{H}_0$ with which a ground state is prepared easily and clearly, apart from $\hat{H}_p$. Next, the Hamiltonian is allowed to transition from $\hat{H}_0$ to $\hat{H}_p$ by spending enough time. When enough time is spent, a system remains in the ground state and a ground state of the Hamiltonian $\hat{H}_p$ is obtained. This is the principle of adiabatic quantum computing. When a calculation time is assumed as $\tau$, the Hamiltonian becomes Equation (1).

$$\hat{H}(t) = \left(1 - \frac{t}{\tau}\right)\hat{H}_0 + \frac{t}{\tau}\hat{H}_p \quad \text{[Equation 1]}$$

The solution which is time-evolved is obtained based on the Schrodinger equation of Equation (2).

$$i\hbar \frac{\partial}{\partial t}|\psi(t)\rangle = \hat{H}(t)|\psi(t)\rangle \quad \text{[Equation 2]}$$

The adiabatic quantum computing is also applicable to the problem that needs the exhaustive search and reaches the solution in a unidirectional process. However, when a calculation process needs to follow the Schrodinger equation of Equation (2), it is necessary to maintain quantum coherence similar to the quantum computer. However, the quantum computer repeats a gate operation for 1 quantum bit or between 2 quantum bits, whereas adiabatic quantum computing is for simultaneously interacting over the entirety of a quantum bit system and the way of thinking for coherence is different. For example, the gate operation to a certain quantum bit is considered. At this time, if there is interaction between the quantum bit and other quantum bits, interaction is cause of decoherence, but in adiabatic quantum computing, all quantum bits are allowed to simultaneously interact and thus, decoherence is not caused in a case such as this example. Adiabatic quantum computing in which this difference is reflected is thought to be robust to decoherence as compared with the quantum computer.

However, there is also a problem to be solved in adiabatic quantum computing. Even though adiabatic quantum computing becomes more robust with respect to decoherence compared to the quantum computer, if a computation process follows the Schrodinger equation of Equation (2), sufficient coherence is needed as well. Matters that a system implement adiabatic quantum computing is a superconducting magnetic flux quantum bit system are a problem to be solved (PTL 1 and NPL 2). This is because in a case of using superconductivity, a cryogenic cooling device is needed. Matters that an extremely low temperature is needed are the problem to be solved for realizing a practical computer.

CITATION LIST

Patent Literature

PTL 1: JP-T-2009-524857

Non Patent Literature

NPL 1: E. Farhi, et al., "A quantum adiabatic evolution algorithm applied to random instances of an NP-complete problem," Science 292, 472 (2001).
NPL 2: A. P.-Ortiz, "Finding low-energy conformations of lattice protein models by quantum annealing," Scientific Reports 2, 571 (2012).
NPL 3: F. Barahona, "On the computational complexity of Ising spin glass models," J. Phys. A: Math. Gen. 15, 3241 (1982).

SUMMARY OF INVENTION

Technical Problem

As described above, adiabatic quantum computing is effective against a challenge that needs an exhaustive search. However, quantum coherence is still needed and a cryogenic cooling device is also needed in a case of using a superconducting quantum bit. A problem to be solved is to provide a practical computer while eliminating these two necessary conditions.

In order to solve the above-described problem, an object of the present invention is to provide a computer does not need quantum coherence or a cryogenic cooling device and a computing program thereof.

Solution to Problem

Spin is used as a variable in the computation and a problem intended to be solved is set using interspin interaction and a local field acting on each spin. All spins are caused to orient toward one direction by an external magnetic field at time t=0 and the external magnetic field is gradually reduced such that the external magnetic field becomes zero at time t=τ. Each spin is time-evolved in such a way that the direction, which follows an effective magnetic field determined by all actions of interspin interaction and external magnetic fields of each site at time t, is determined. In this case, the direction of spin is not completely aligned in the effective magnetic field and is caused to be a quantum mechanically corrected direction such that the system is caused to maintain in an approximately ground state.

Additionally, a term (relaxation term) to maintain each spin in an original direction during time evolution is added to the effective magnetic field to improve convergence of a solution.

Advantageous Effects of Invention

Although quantum mechanical correction is made in this method, the method operates in a classical system. For that reason, there is no need to take quantum coherence into account and resources in a wide range are available. When energy scale on the bit is set to be sufficiently larger than energy scale of a temperature, temperature fluctuations can also be ignored and a special apparatus such as a cryogenic apparatus and a special environment is not needed.

The relaxation term is added to thereby suppress vibration related to a spin direction in time evolution and improve convergence of a solution.

DESCRIPTION OF EMBODIMENTS

Figure 1:
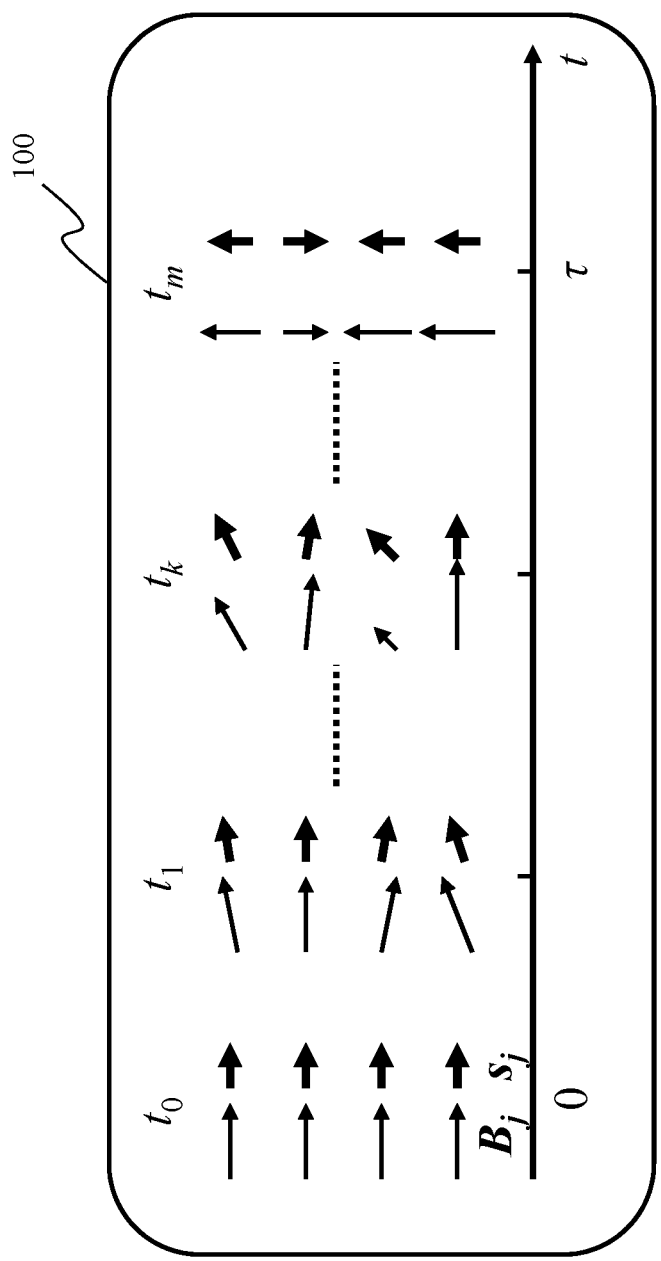
FIG. 1 is a schematic diagram for explaining algorithm of the present invention in principle.

In the following, various examples of the present invention together with a principle of computation will be described with reference to the accompanying drawings. However, the present invention is not to be construed as being limited to the description in the following embodiment. Matters that change to a specific configuration of the present invention may be made without departing from the spirit or gist of the present invention is easily understood by a person skilled in the art.

In a configuration of an invention to be described below, the same portions or portions having similar functions are denoted by the same reference numerals to be commonly used in different drawings and redundant descriptions thereof will be omitted.

Notations such as "first", "second", and "third" in the present specification are intended to identify constituents and are not necessarily intended to limit the number or order. Furthermore, the number for identifying constituents is used for each context and the number used in one context does not necessarily indicate the same configuration also in other contexts. The constituent identified by a certain number is not precluded from functioning as the constituent identified by other numbers as well.

A position, size, shape, range or the like of each configuration indicated in the drawings and the like may not represent an actual position, size, shape, range or the like for easy understanding of an invention. For that reason, the present invention is not necessarily limited to the position, size, shape, range or the like disclosed in the drawings and the like.

Adiabatic quantum computing is also called quantum annealing as an alias and is one obtained by developing the concept of classical annealing to quantum mechanics. That is, adiabatic quantum computing can operate in a classical basis of behavior and can be interpreted that quantum mechanical effects are added in order to improve performance in terms of high-speed or a correct answer rate of a solution. In the present invention, a computing component itself is assumed to classical one and parameters determined quantum mechanically are introduced in the computation process to thereby realize a computing method and apparatus that are classical ones but include quantum mechanical effects.

Based on the concept described above, a classical algorithm to obtain a ground state as a solution and an apparatus for realizing will be described in the following description, while explaining relevance to adiabatic quantum computing.

A typical form to be described in the following example is a computer which includes a computing unit, a storing unit, and a control unit and performs computation while exchanging data between the storing unit and the computing unit by control of the control unit, and in which N variables $s_j^z$ (j=1, 2, ..., N) take a range of $-1 \leq s_j^z \leq 1$ and a problem to be solved is set using a local field $g_j$ and intervariable interaction $J_{ij}$ (i, j=1, 2, ..., N). In the computing unit, computation is discretely performed from $t=t_0$ ($t_0=0$) to $t_m$ ($t_m=\tau$) by dividing time into m timepieces, $B_j^z(t_k)=\{\Sigma_i J_{ij} s_i^z(t_{k-1})+g_j+\text{sgn}(s_j^z(t_{k-1}))\cdot g_{pina}\}\cdot t_k/\tau$ or $B_j^z=\{\Sigma_i J_{ij} s_i^z(t_{k-1})+g_j+g_{pinb}\cdot s_j^z(t_{k-1})\}\cdot t_k/\tau$ is obtained by using a value of a variable $s_i^z(t_{k-1})$ (i=1, 2, ..., N) of previous time $t_{k-1}$ and a coefficient $g_{pina}$ or $g_{pinb}$ of a relaxation term each time when the variable $s_j^z(t_k)$ is obtained at each time $t_k$, and a function f is determined so as to cause the range of the variable $s_j^z(t_k)$ to become $-1 \leq s_j^z(t_k) \leq 1$ and results in $s_j^z(t_k)=f(B_j^z(t_k), t_k)$, the variable $s_j^z$ is caused to approach $-1$ or $1$ by making a time step advance from $t=t_0$ to $t=t_m$, and finally determines a solution in such a way that if $s_j^z<0$, then $s_j^{zd}=-1$ and otherwise, if $s_j^z>0$, then $s_j^{zd}=1$.

The coefficient $g_{pinb}$ is, for example, a value from 50% to 200% of an average value of $|J_{ij}|$. With respect to the local field $g_j$ for setting of a problem to be solved, it is possible to add a correction term $\delta g_{j'}$ to $g_{j'}$ only for a certain site j' and increase the size of $g_{j'}$ only for the site j'. The correction term $\delta g_{j'}$ is, for example, a value from 10% to 100% of the average value of $|J_{ij}|$.

Example 1

In Example 1, a principle of the present invention will be described through migration to a classical form starting from quantum mechanical description.

Ising spin-Hamiltonian ground state search problem given by Equation (3) includes a classification problem called NP-hard and is known to be a useful problem (NPL 3).

$$\hat{H}_P = -\sum_{i>j} J_{ij} \hat{\sigma}_i^z \hat{\sigma}_j^z - \sum_j g_j \hat{\sigma}_j^z \quad \text{[Equation 3]}$$

$J_{ij}$ and $g_j$ are problem to be solved-setting parameters and $\hat{\sigma}_j^z$ takes eigenvalues of $\pm 1$ in the z-component of Pauli spin matrix. i and j represent sites of spin. Ising spin is a variable taking only $\pm 1$ as a value such that an Ising spin system is formed with the eigenvalues of $\pm 1$ of the $\hat{\sigma}_j^z$ in Equation (3). Ising spin of Equation (3) needs not be literally spin and may be anything physically as long as the Hamiltonian is described by Equation (3). For example, it is possible to associate high and low of a logic circuit to $\pm 1$ and is also possible to associate a vertically polarized wave and horizontally polarized wave of light to $\pm 1$ or associate 0 phase and $\pi$ phase to $\pm 1$. In the method of the present example, similar to adiabatic quantum computing, a computation system is prepared in the ground state of the Hamiltonian given by Equation (4) at time $t=0$.

$$\hat{H}_0 = -\gamma \sum_j \hat{\sigma}_j^x \quad \text{[Equation 4]}$$

$\gamma$ is a proportional constant determined by the magnitude of an external field uniformly applied to all sites j and $\hat{\sigma}_j^x$ is the x-component of Pauli spin matrix. If a computation system is spin itself, the external field means a magnetic field. Equation (4) is equivalent to the Hamiltonian obtained by applying a transverse magnetic field and a case where all spins are directed to the x-direction ($\gamma>0$) is the ground state. Although the Hamiltonian for setting of a problem is defined as the Ising spin system having only the z-component, the x-component of spin appears in Equation (4). Accordingly, spin in the computation process is a vector (Bloch vector) rather than Ising. Although the Hamiltonian of Equation (4) is started at $t=0$, the Hamiltonian gradually changes with the progress of time t and becomes the Hamiltonian described by Equation (3), and finally, the ground state of Equation (4) is obtained as a solution.

First, it considers how spin respond to the external field in a case of a 1-spin system. The Hamiltonian of the 1-spin system is given by Equation (5).

$$\hat{H} = -B \cdot \hat{\sigma} \quad \text{[Equation 5]}$$

Here, $\hat{\sigma}$ represents three components of the Pauli spin matrix as a vector. In a case where spin is directed to a magnetic field direction, the ground state is written as $<\hat{\sigma}>=B/|B|$ by using $<\bullet>$ as a quantum mechanical expected value. In the adiabatic process, the system always tries to keep the ground state and thus, the spin direction always follows the direction of magnetic field.

The above discussion can be extended to a multi-spin system. At $t=0$, the Hamiltonian is given by Equation (4). This means that the magnetic field $B_j^x=\gamma$ is uniformly applied to all spins. At $t>0$, the x-component of the magnetic field is gradually weakened and becomes $B_j^x=\gamma(1-t/\tau)$. Regarding the z-component, interspin interaction exists and thus, the effective magnetic field is represented as Equation (6).

$$\hat{B}_j^z(t) = \frac{t}{\tau}\left(\sum_{i \neq j} J_{ij} \hat{\sigma}_i^z + g_j\right) \quad \text{[Equation 6]}$$

The spin direction is specified by a $<\hat{\sigma}_j^z>/<\hat{\sigma}_j^x>$ and thus, if spin direction follows the effective magnetic field, spin direction is determined by Equation (7).

$$\langle\hat{\sigma}_j^z\rangle/\langle\hat{\sigma}_j^x\rangle = \langle\hat{B}_j^z(t)\rangle/\langle\hat{B}_j^x(t)\rangle \quad \text{[Equation 7]}$$

Although Equation (7) is quantum mechanical description, but since Equation (7) takes an expected value, Equation (7) is a related equation related a classical quantity unlike Equations (1) to (6). Since non-local correlation (quantum entanglement) of quantum mechanics does not exist in the classical system, the spin direction is completely determined by the local field of each site and Equation (7) determines the behavior of the classical spin system. Although non-local correlation exists in the quantum system and thus, Equation (7) is deformed, matters regarding this will be described in and after Example 2, and a classical system determined by Equation (7) will be described in the present example in order to describe a basic form of the invention.

FIG. 1 illustrates a timing chart (procedure 100) for obtaining the ground state of spin system. Description of FIG. 1 is related to a classical quantity and thus, spin of a site j is represented by $s_j$ rather than $\hat{\sigma}_j$. Because of this, an effective magnetic field $B_j$ of FIG. 1 is a classical quantity.

At t=0, a right effective magnetic field $B_j$ is applied to all sites and all spins $s_j$ are initialized to the right direction. In accordance with the lapse of the time t, the magnetic field in the z-axis direction and interspin interaction are gradually applied, spin finally becomes the +z-direction or −z-direction and the z-component of spin $s_j$ becomes $s_j^z=+1$ or −1. Although time t is ideal to be continuous, time t is discrete in the actual computation process and convenience can be improved. In the following, a case of being discrete will be described.

Since the z-component as well as the x-component is applied, spin according to the present invention is vectorial spin. The behavior as a vector can be understood also from FIG. 1. Thus far, the y-component was not appeared, this is because an external field direction is taken in the xz-plane and thus, the y-component of the external field does not exist and accordingly, it becomes that $<\sigma^y>=0$. Although a three-dimensional vector having a magnitude of 1 (this is called the Bloch vector and a state can be described using a point on a sphere) is supposed as spin of the computation system, only two dimensions may be considered in a method for taking axes of the present example (a state can be described using a point on a circle). Since γ is constant, $B_j^x(t)>0$ (γ>0) or $B_j^x(t)<0$ (γ<0) is satisfied. In this case, the two-dimensional spin vector becomes possible to describe only a semicircle, and if $s_j^z$ is designated by [−1, 1], the two-dimensional spin vector is determined by one variable of $s_j^z$. Accordingly, although spin of the present invention is a two-dimensional vector, the spin may be denoted by one-dimensional continuous variables which use [−1, 1] as the range.

In a procedure 100 of FIG. 1, the effective magnetic field is obtained for each site at time $t=t_k$ and spin direction at time $t=t_k$ is obtained by Equation (8) using the value of the effective magnetic field.

$$s_j^z(t_k)/s_j^x(t_k)=B_j^z(t_k)/B_j^x(t_k) \quad \text{[Equation 8]}$$

Equation (8) is obtained by rewriting Equation (7) to the notation on the classical quantity and thus, the symbol of <•> is not added.

Next, an effective magnetic field at $t=t_{k+1}$ will be obtained by using a value of spin at $t=t_k$. If the effective magnetic field at each time is specifically written, the effective magnetic field becomes Equations (9) and (10).

$$B_j^x(t_{k+1}) = \left(1 - \frac{t_{k+1}}{\tau}\right)\gamma \quad \text{[Equation 9]}$$

$$B_j^z(t_{k+1}) = \frac{t_{k+1}}{\tau}\left(\sum_{i \neq j} J_{ij}s_i^z(t_k) + g_j\right) \quad \text{[Equation 10]}$$

In the following, spin and the effective magnetic field are alternately obtained in accordance with a procedure schematically illustrated in the procedure 100 of FIG. 1.

In a classical system, the magnitude of a spin vector is 1. In this case, each component of spin vector is described as $s_j^z(t_k)=\sin\theta$ and $s_j^x(t_k)=\cos\theta$ by using the parameter θ defined in $\tan\theta=B_j^z(t_k)/B_j^x(t_k)$. This is rewritten again like $s_j^z(t_k)=\sin(\arctan(B_j^z(t_k)/B_j^x(t_k)))$, $s_j^x(t_k)=\cos(\arctan(B_j^z(t_k)/B_j^x(t_k)))$.

As is evident from Equation (9), only $t_k$ is the variable of $B_j^x(t_k)$ and τ and γ are constants. Accordingly, $s_j^z(t_k)=\sin(\arctan(B_j^z(t_k)/B_j^x(t_k)))$ and $s_j^x(t_k)=\cos(\arctan(B_j^z(t_k)/B_j^x(t_k)))$ may be generally represented to be $s_j^z(t_k)=f_1(B_j^z(t_k), t_k)$ and $s_j^x(t_k)=f_2(B_j^z(t_k), t_k)$ as a function having $B_j^z(t_k)$ and $t_k$ as variables.

Although spin is described as the two-dimensional vector and thus two components of $s_j^z(t_k)$ and $s_j^x(t_k)$ appear, if $B_j^z(t_k)$ is determined based on Equation (10), $s_j^x(t_k)$ is not needed. This responds to the matters that a spin state can be described by only $s_j^z(t_k)$ having [−1, 1] as a range. The final solution $s_j^{zd}$ needs to become $s_j^{zd}=-1$ or 1 and it is assumed that if $s_j^z(\tau)>0$, then $s_j^{zd}=1$, and otherwise, if $s_j^z(\tau)<0$, then $s_j^{zd}=-1$.

Figure 2:
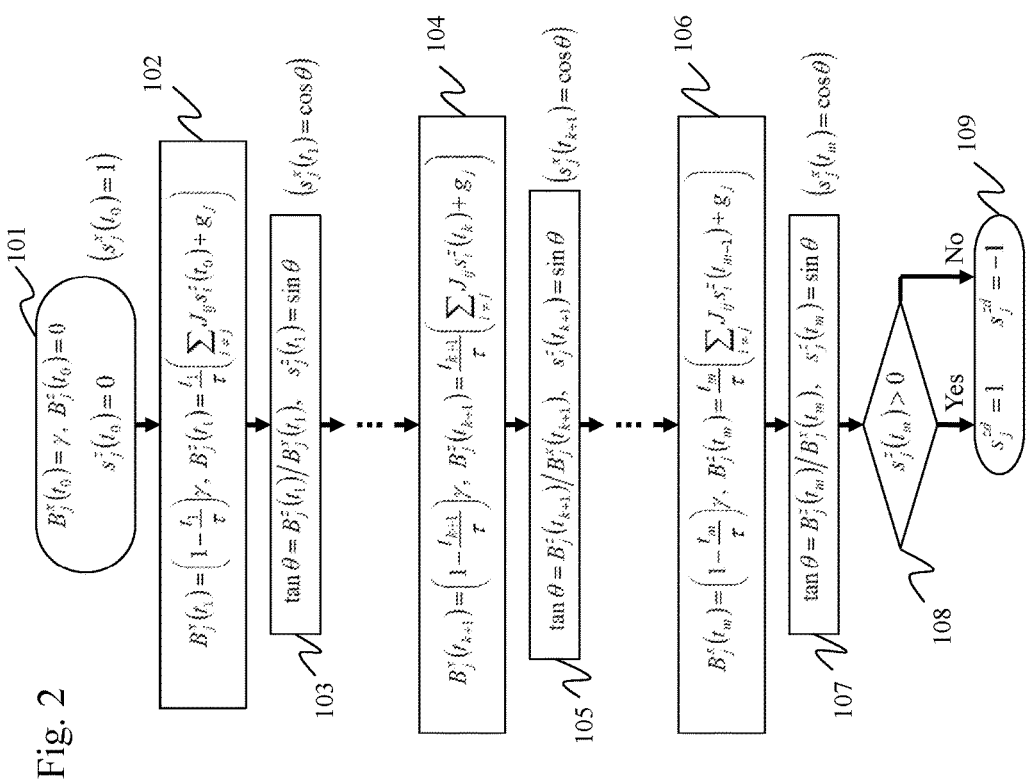
FIG. 2 is a diagram illustrating an example of algorithm according to Example 1 as a flowchart.

FIG. 2 illustrates a flowchart in which the algorithm described above is summarized. Here, $t_m=\tau$. Each of steps 101 to 109 of the flowchart of FIG. 2 corresponds to processing at a certain time of the procedure 100 of FIG. 1 throughout a period of time from t=0 to t=τ. That is, each of steps 102, 104, and 106 of the flowchart corresponds to Equations (9) and (10) at each of $t=t_1$, $t_{k+1}$, and $t_m$. The final solution is determined in step 108 in such a way that if $s_j^z<0$, then $s_j^{zd}=-1$, and otherwise, if $s_j^z>0$, then $s_j^{zd}=1$ (109).

Thus far, it is indicated how a problem to be solved is solved in a case where the problem to be solved is represented by Equation (3). Next, description will be made by enumerating a specific example as to how a specific problem to be solved is represented by Equation (3) including a local field $g_j$ and intervariable interaction $J_{ij}$ (i, j=1, 2, . . . , N). For example, a problem of electrical power supply management is considered as the specific problem to be solved. In this case, the local field is an amount of a natural phenomenon such as a temperature, or an electrical power use amount. That is, it is assumed that the temperature of each district is represented by the local field $g_j$ (j=1-10), the electrical power use amount of public facilities (library, theater, supermarket, and the like) in each district is represented by the local field $g_j$ (j=11-20), and the electrical power use amount of each household is represented by the local field $g_j$ (j=21-100).

$\hat{\sigma}_j^z$ (j=11-100) is a variable indicating where electrical power is to be distributed. However, j=1-10 is a subscript representing the temperature and thus, $\hat{\sigma}_j^z$ (j=1-10) does not represent electrical power distribution and considers the temperature as a variable which influences activities of public facilities or households. The temperature is determined by a natural phenomenon and is hardly influenced by artificial factors and thus, the local field $g_j$ (j=1-10) is set to a large value so that $\hat{\sigma}_j^z$ (j=1-10) is not influenced by other variables.

Correlation intensity between the temperature and activities of the public facilities and households is represented through intervariable interaction $J_{ij}$. The correlation of the temperature and electrical power use is also influenced by the concept of electrical power sharing that is proposed in recent years. For example, the electrical power sharing is a movement that tries to reduce electrical power of each household in such a way that household members go to the public facilities without using an air conditioner at each household in a period of time at which air-conditioning is needed. The movement is represented by allowing a non-zero value of intervariable interaction $J_{ij}$ to be taken with respect to the subscript i=11-20 which represents the public facilities and the subscript j=21-100 which represent the house. However, interaction based on this concept is smaller compared to direct correlation on the temperature and activities of households and thus, the value of intervariable interaction $J_{ij}$ is relatively small. Respective households do not live independently and influence on each other and thus, intervariable interaction $J_{ij}$ (i, j=21-100) also becomes finite. The intervariable interaction $J_{ij}$ is specifically set through the discussion as described above and the optimum electrical power supply distribution (eigenvalue of $\hat{\sigma}_j^z=+1$ or $-1$) is obtained through the ground state search of Equation (3).

In a case where it is unable to represent $\hat{\sigma}_j^z$ for each item by a single variable, a plurality of $\hat{\sigma}_j^z$ may be used and according to this, the plurality of the local fields $g_j$ and intervariable interaction $J_{ij}$ may also be used for each item. Although $\hat{\sigma}_j^z$ is the variable representing electrical power distribution, $\hat{\sigma}_j^z$ is correlated with human movement and an opening situation of public facilities. For that reason, it can be interpreted as "certain public facility is closed" by the obtained solution.

Description as above is a simple example that represents a specific problem to be solved by Equation (3). The specific problem to be solved to which the present example is applicable is not limited to the problem of electrical power supply management as exemplified as above and is applicable to a lot of problems to be solved, for example, travel route optimization, vehicle guidance for avoiding congestion, circuit design, product supply management, scheduling, and financial assets selection.

Example 2

In Example 1, the transition to the classical quantity was made by taking the expected value based on a quantum mechanical equation, and the algorithm by the classical quantity was described using FIG. 1 and FIG. 2. A major aim of Example 1 is to describe the algorithm of the present invention and thus, description was made without including the quantum mechanical effect. However, if the quantum mechanical effect is added, improvement of a correct answer rate or improvement of a computation speed can be expected. In Example 2, description will be made on a method in which algorithm itself is a classical but a correction parameter is added based on quantum mechanics in order to improve performance.

There are a linear superposition state and quantum entanglement (non-local correlation) as the characteristics of quantum mechanics. For example, a quantum bit that takes two states of $|0\rangle$ and $|1\rangle$ is considered. The linear superposition state is one that is the sum of two states as $|\psi\rangle=\alpha|0\rangle+\beta|1\rangle$. The nature of the linear superposition state is already incorporated by vectorially treating spin in Example 1. That is, if $s_j^z(t_k)=1$, then the state is $|0\rangle$, and otherwise, if $s_j^z(t_k)=-1$, then the state is $|1\rangle$. $|0\rangle$ and $|1\rangle$ correspond to the state in a case where the z-axis is selected as an quantization axis of spin, and a case of $s_j^x(t_0)=1$ which is directed to the x-axis is represented $|\psi(t_0)\rangle=(|0\rangle+|1\rangle)/\sqrt{2}$. If $s_j^x(t)=-1$, then the state is $|\psi(t_0)\rangle=(|0\rangle-|1\rangle)/\sqrt{2}$. Taking the x-axis into consideration means that linear superposition is considered.

In the present example, the quantum entanglement which is the quantum mechanical effect will be described. As an example, a case where a state of a 2-quantum bit system can be written as $|\psi\rangle=\alpha|00\rangle+\beta|11\rangle$ is considered. It is expressed that $|\alpha|^2+|\beta|^2=1$ by the standardization condition. The first variable and the second variable of $|00\rangle$ and $|11\rangle$ represent a first quantum bit and a second quantum bit, respectively. Since $\hat{\sigma}_j^z|0\rangle=|0\rangle$ and $\hat{\sigma}_j^z|1\rangle=-|1\rangle$ as nature of the Pauli spin matrix, it becomes that $\hat{\sigma}_1^z|\psi\rangle=\alpha|00\rangle-|11\rangle$ and $\langle\psi|\hat{\sigma}_1^z|\psi\rangle=|\alpha|^2-|\beta|^2$. Since $\hat{\sigma}_1^x|0\rangle=|1\rangle$ and $\hat{\sigma}_1^x|1\rangle=|0\rangle$, it becomes that $\hat{\sigma}_1^x|\psi\rangle=\alpha|10\rangle+\beta|01\rangle$ and $\langle\psi|\hat{\sigma}_1^x|\psi\rangle=0$. Since $\hat{\sigma}_1^y|0\rangle=i|1\rangle$ and $\hat{\sigma}_1^y|1\rangle=-i|0\rangle$, it becomes that $\hat{\sigma}_1^y|\psi\rangle=i\alpha|10\rangle-i\beta|01\rangle$ and $\langle\psi|\hat{\sigma}_1^y|\psi\rangle=0$. Accordingly, it is expressed that $\langle\hat{\sigma}_1^x(\tau)\rangle^2+\langle\hat{\sigma}_1^y(\tau)\rangle^2+\langle\hat{\sigma}_1^z(\tau)\rangle^2=(|\alpha|^2-|\beta|^2)^2$. As an extreme example, in a case of $\alpha=\beta$ at which quantum entanglement is maximized, it becomes that $\langle\hat{\sigma}_1^x(\tau)\rangle^2+\langle\hat{\sigma}_1^y(\tau)\rangle^2+\langle\hat{\sigma}_1^z(\tau)\rangle^2=0$ and the magnitude of the first spin vector becomes 0. Such a situation does not occur in the absence of quantum entanglement. For example, 1-spin system is considered and if a state is assumed to be $|\psi\rangle=\alpha|0\rangle+\beta|1\rangle$, then it becomes that $\langle\psi|\hat{\sigma}_1^z|\psi\rangle=|\alpha|^2-|\beta|^2$, $\langle\psi|\hat{\sigma}_1^x|\psi\rangle=\alpha^*\beta+\alpha\beta^*$, $\langle\psi|\hat{\sigma}_1^y|\psi\rangle=i\alpha\beta^*-i\alpha^*\beta$, and $\langle\hat{\sigma}_1^x(\tau)\rangle^2+\langle\hat{\sigma}_1^y(\tau)\rangle^2+\langle\hat{\sigma}_1^z(\tau)\rangle^2=(|\alpha|^2+|\beta|^2)^2=1$, and accordingly, the magnitude is certainly saved to 1.

As described above, although it is one example, it was found out that in a case where quantum entanglement is present, the magnitude of spin vector is not saved to 1. In a classical system, the magnitude of spin vector is a fixed value of 1, but if quantum entanglement is present, the magnitude of spin vector is not 1. In Example 1, on the premise that the magnitude of spin vector is 1, it was set in such a way $s_j^z(t_k)=\sin\theta$ and $s_j^x(t_k)=\cos\theta$ by using $\theta$ defined by $\tan\theta=\langle B_j^z(t)\rangle/\langle B_j^x(t)\rangle$ as a parameter. However, in this method, nature of quantum entanglement inherent in the system is not reflected. Here, the way to reflect nature of quantum entanglement is considered.

As described above, spin vector is not saved to 1. Here, a correction parameter $r_s$ ($0<=r_s<=1$) representing the magnitude of spin is defined ("<=" means "greater than or equal to"). A proportional relationship of Equation (8) is not satisfied by being associated with matters that spin vector is not saved to 1. Here, the correction parameter $r_B$ is defined to deform Equation (8) to Equation (11).

$$s_j^z(t_k)/s_j^x(t_k)=r_B B_j^z(t_k)/B_j^x(t_k) \qquad \text{[Equation 11]}$$

Similar to the case of Example 1, an angle $\theta$ representing the spin direction is defined by $\tan\theta=s_j^z(t_k)/s_j^x(t_k)$. If Equation (11) is applied to this, then $\tan\theta=r_B\cdot B_j^z(t_k)/B_j^x(t_k)$. Considering that the magnitude of spin is $r_s$, it becomes that $s_j^z(t_k)=r_s\cdot\sin\theta$ and $s_j^x(t_k)=r_s\cdot\cos\theta$. By these related equations, effects of quantum entanglement are incorporated into the classical algorithm through the correction parameters $r_s$ and $r_B$. If it is notated by not using $\theta$, it becomes that $s_j^z(t_k)=r_s\cdot\sin(\arctan(r_B\cdot B_j^z(t_k)/B_j^x(t_k)))$ and $s_j^x(t_k)=r_s\cdot\cos(\arctan(r_B\cdot B_j^z(t_k)/B_j^x(t_k)))$. If $r_s$ and $r_B$ are incorporated into functions $f_1$ and $f_2$, then $s_j^z(t_k)=f_1(B_j^z(t_k), t_k)$ and $s_j^x(t_k)=f_2(B_j^z(t_k), t_k)$.

It is preferable that the correction parameters $r_s$ and $r_B$ are originated in quantum entanglement and finely controlled depending on $t_k$, $s_j^z(t_k)$ and $s_j^x(t_k)$. However, it is difficult to accurately acquire information about quantum entanglement in principle and it is necessary to consider any coping method. Although it is actually determined semi-empirically depending on a problem, a coarse determining method becomes as follows. The $r_B$ is an amount of which the sign can be changed and is an amount obtained by most properly reflecting quantum entanglement. On the other hand, the $r_s$ is a correction factor satisfying $0<=r_s<=1$ and has a role smaller than the $r_B$. Accordingly, the $r_s$ may be set to be $r_s=\sim1$ over the total computation time ("=~" means "approximately equal to") and mainly incorporates quantum effects by the $r_B$. Since there is no quantum entanglement at the start of the computation, $r_B=1$ at $t=0$ and $r_B$ gradually comes closer to 0 at $t>0$. If it comes closer to $t=\tau$, many of spins converge to $s_j^z=1$ or $-1$, but some of spins behave subtly of whether to become $s_j^z>0$ or $s_j^z<0$. What ultimately determines success or failure of the computation is these spins having bad convergence. Accordingly, at $t=\sim\tau$, the $r_B$ is determined so as to be most suitable for these spins. Effects of quantum entanglement are incorporated as much as possible and thus, $r_B=\sim0$. The direction of spin converging to $s_j^z=1$ or $-1$ is stable such that there is little adverse effect according to the fact that $r_B=\sim 0$.

Description as above is the method for setting the $r_B$ regarding time dependency. It is also effective to provide magnetic field dependency to $r_B$. In a case of $B_j^z(t_k)/B_j^x(t_k)=\sim 0$, $s_j^z(t_k)/s_j^x(t_k)$ becomes inevitably indefinite. Accordingly, in a case of $B_j^z(t_k)/B_j^x(t_k)=\sim 0$, it is effective to speed up a change in which $r_B$ becomes from $r_B=\sim 1$ to $r_B=\sim 0$ with the progress of time t, in comparison with a case of $|B_j^z(t_k)/B_j^x(t_k)|>>0$.

Although in a case where there is no special intersite features, the $r_s$ or $r_B$ is not allowed to have site dependency, in a case where the feature per site is known in advance, it may be needed to respond to each feature and if the $r_s$ and $r_B$ become site dependent, improvement of the correct answer rate of a solution can be expected.

Figure 3:
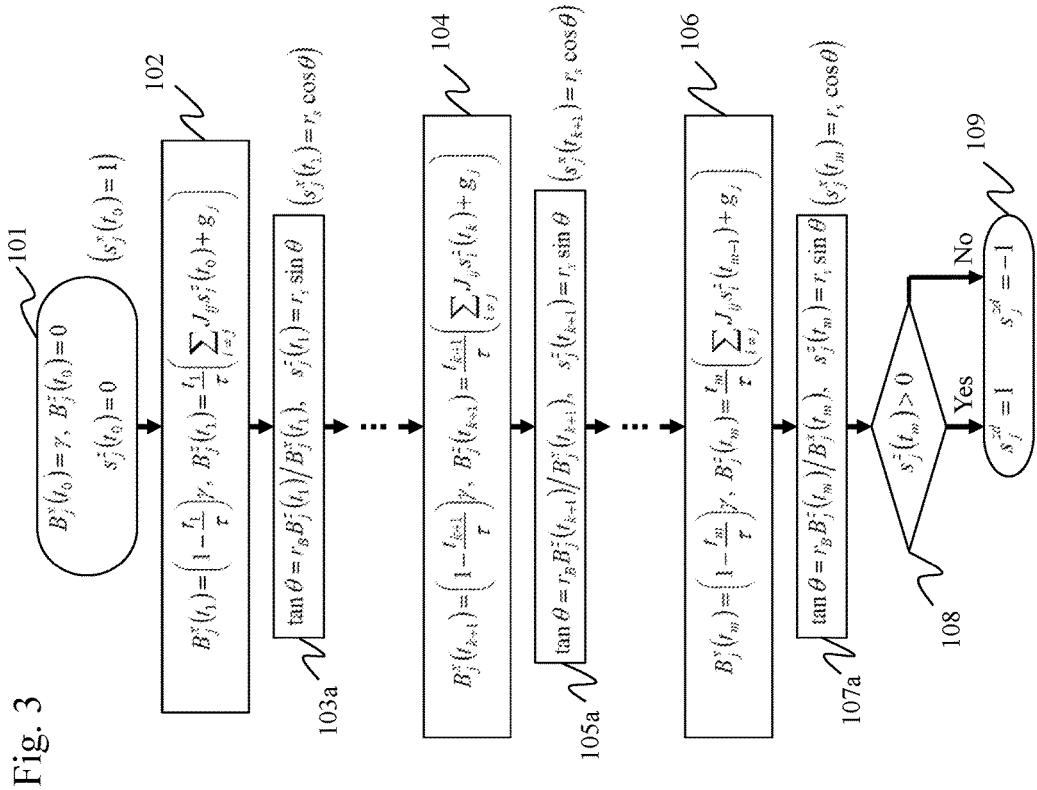
FIG. 3 is a diagram illustrating an example of algorithm according to Example 2 as a flowchart.

FIG. 3 illustrates a flowchart in a case where the $r_s$ and $r_B$ are introduced. The difference between the flowcharts of FIG. 2 and FIG. 3 is that steps 103, 105, and 107 are changed to steps 103a, 105a, and 107a, that include the correction parameters $r_s$ and $r_B$, respectively. In this example, as described above, the correction parameters $r_s$ and $r_B$ are added to the function f, $\theta$ is defined by $\tan\theta=r_B\cdot B_j^z(t_k)/B_j^x(t_k)$, $s_j^z(t_k)$ is determined by $s_j^z(t_k)=r_s\cdot\sin\theta$, and accordingly, the function f becomes $f(B_j^z(t_k) t_k)=r_s\cdot\sin(\arctan(r_B\cdot B_j^z(t_k)/B_j^x(t_k)))$. It is desirable that the correction parameters $r_s$ and $r_B$ are finely controlled depending on $t_k$ and $B_j^z(t_k)$.

Example 3

In Examples 1 and 2, the Hamiltonian of the problem to be solved was given by Equation (3) and the effective magnetic field of each site was given by Equations (9) and (10). The local field $g_j$ was present in each site. If the local field $g_j$ is present, a direction of $s_j^z$ determined by $g_j$ becomes a zero-approximation direction and the direction of $s_j^z$ is corrected with application of interaction determined by $J_{ij}$. However, in a case where all sites becomes $g_j=0$, a concept of the zero-approximation direction is not present and a degeneration number is increased and thus, whether it becomes $s_j^z>0$ or $s_j^z<0$ is not determined and, $s_j^z$ is not escaped from $s_j^z=\sim 0$ even if the computation time has elapsed. When it is not the correct answer even if $s_j^z$ is escaped therefrom, a force, which reverses the direction between spins, is applied to each other as a result from interspin interaction, a vibration phenomenon in which the direction of spin is reversed occurs at each step of time, and the solution is not converged.

In order to solve these problems, a relaxation term (pin fixture term) is added to Equation (10) to allow the effective magnetic field to be set as Equation (12A).

$$B_j^z(t_{k+1}) = \frac{t_{k+1}}{\tau}\left(\sum_{i \neq j} J_{ij}s_i^z(t_k) + g_j + \text{sgn}(s_j^z(t_k))\cdot g_{pina}\right) \quad \text{[Equation 12A]}$$

The third term is the relaxation term. $\text{sgn}(\cdot)$ is a sign function and $\text{sgn}(s_j^z)=1$ for $s_j^z>0$, $\text{sgn}(s_j^z)=0$ for $s_j^z=0$, and $\text{sgn}(s_j^z)=-1$ for $s_j^z<0$. The relaxation term serves to keep based on spin direction to eliminate the above-described vibration phenomenon and improve convergence of a solution. The value of $g_{pina}$ is empirically determined. The relaxation term is an additional term for improving convergence of a solution and needs to be sufficiently smaller than $|J_{ij}|$. On the other hand, if it is too small, enough work cannot be expected. If a range is specified, it is considered appropriate that the coefficient $g_{pina}$ is adjusted to be a value from 1% to 50% of the average value of $|J_{ij}|$. As a guide, the coefficient $g_{pina}$ may be set to about $1/10$ of the average value of $|J_{ij}|$.

The relaxation term (third term) of Equation (12A) depends only on the sign of $s_j^z$ and does not depend on the size of $s_j^z$. On the other hand, the first term depends on the size of $s_j^z$. There is a method in which the third term also depends on the size of $s_j^z$. Such a case corresponds to Equation (12B).

$$B_j^z(t_{k+1}) = \frac{t_{k+1}}{\tau}\left(\sum_{i \neq j} J_{ij}s_i^z(t_k) + g_j + g_{pinb}\cdot s_j^z(t_k)\right) \quad \text{[Equation 12B]}$$

The size of the third term in a case of Equation (12B) is changed depending on the size of $s_j^z$ and thus, the coefficient $g_{pinb}$ typically has a size of about an average value of $|J_{ij}|$ and is in the order of 50% to 200% in a range point of view.

In a case where the ground state is degenerated, it is necessary to induce computation into one solution. When the computation is not induced, it is not escaped from $s_j^z=\sim 0$ which is the average value of the solution. The relaxation term is also useful for this induction. It is necessary to appropriately set a zero-approximation solution in order to induce the computation to one solution. Here, it is assumed that a single site (assumed as j site) assumed to be a reference is selected and set as $s_j^z(t_0)=1$ and the direction of other sites is determined based on the sign of $J_{ij}$ by using the j site as a reference at an early stage. In this way, appropriate setting of zero-approximation is made and the computation is converged to one correct answer through the computation of the local field response after the setting. In this case, the relaxation term contributes as in the following.

At $t=t_0$, it is set as $s_j^z(t_0)=1$ and $s_i^z(t_0)=\sim 0$ ($i\neq j$), Equation (12A) or Equation (12B) is time-evolved based on Equation (11). Here, $s_i^z(t_0)=\sim 0$ ($i\neq j$) means that it is set to, for example, about $s_i^z(t_0)=1/1000$, so that the $s_i^z$ hardly influences on other sites. By the time step $t_0\rightarrow t_1$, $s_i^z>0$ or $s_i^z<0$ is obtained for an i site at which $J_{ij}$ becomes $J_{ij}\neq 0$ based on Equation (12A) or Equation (12B) and Equation (11). Although initial setting of $s_j^z(t_0)=1$ is not propagated at step of $t_0\rightarrow t_1$ for the i site at which $J_{ij}$ becomes $J_{ij}=0$, the number of sites at which $s_i^z$ becomes $s_i^z>0$ or $s_i^z<0$ is increased and thus, the initial setting of $s_j^z(t_0)=1$ is indirectly propagated through the site in the next time step and almost all sites become $s_i^z>0$ or $s_i^z<0$ at an early stage of the computation. Since the relaxation term is present, $s_j^z>0$ of the j site is maintained at an early stage of the computation and information of $s_j^z(t_0)=1$ is propagated to almost all sites while a history of $s_j^z(t_0)=1$ remains in the j site itself. This is the appropriate setting of zero-approximation.

FIG. 4 illustrates a flowchart in a case where the relaxation term is added. FIG. 4A corresponds to Equation (12A) and FIG. 4B corresponds to Equation (12B). The difference between the flowcharts of FIG. 3 and FIG. 4 is that steps 102, 104, and 106 are changed to steps 102b, 104b, and 106b that include the relaxation term.

Figure 4A:
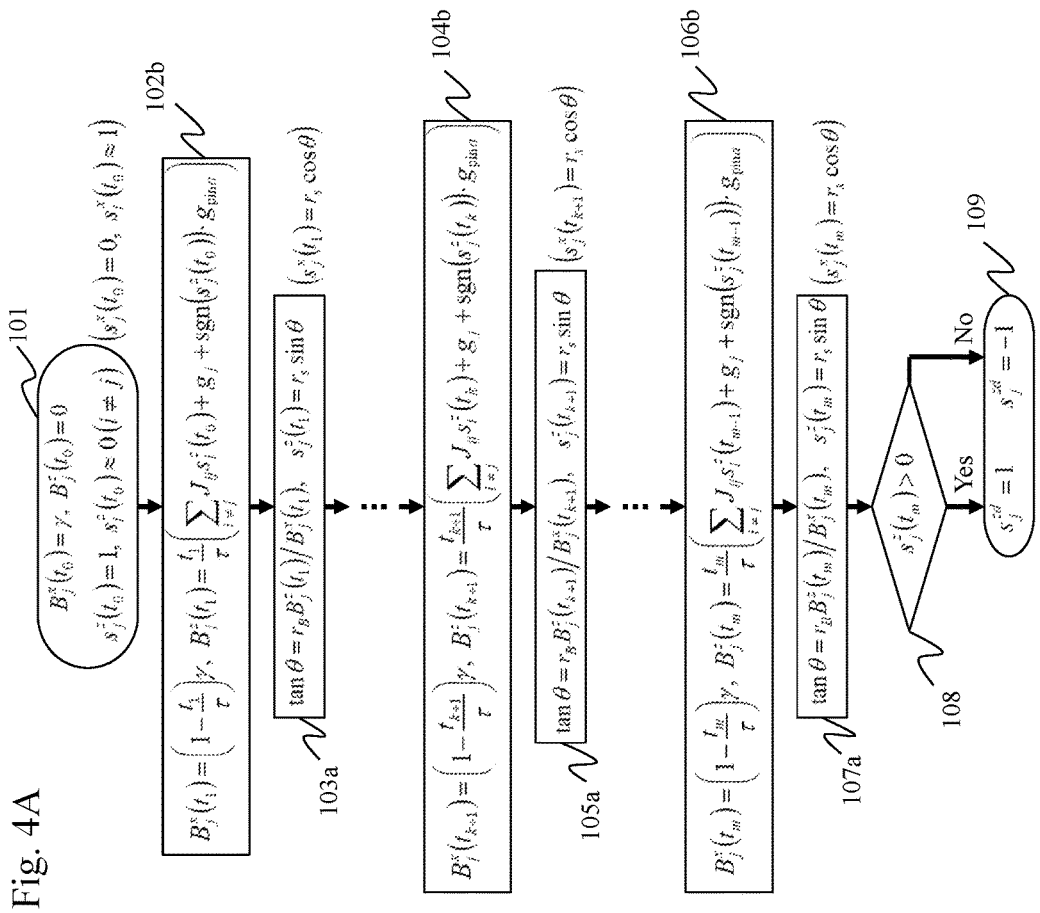
FIG. 4A is a diagram illustrating an example of algorithm according to Example 3 as a flowchart.
Figure 4B:
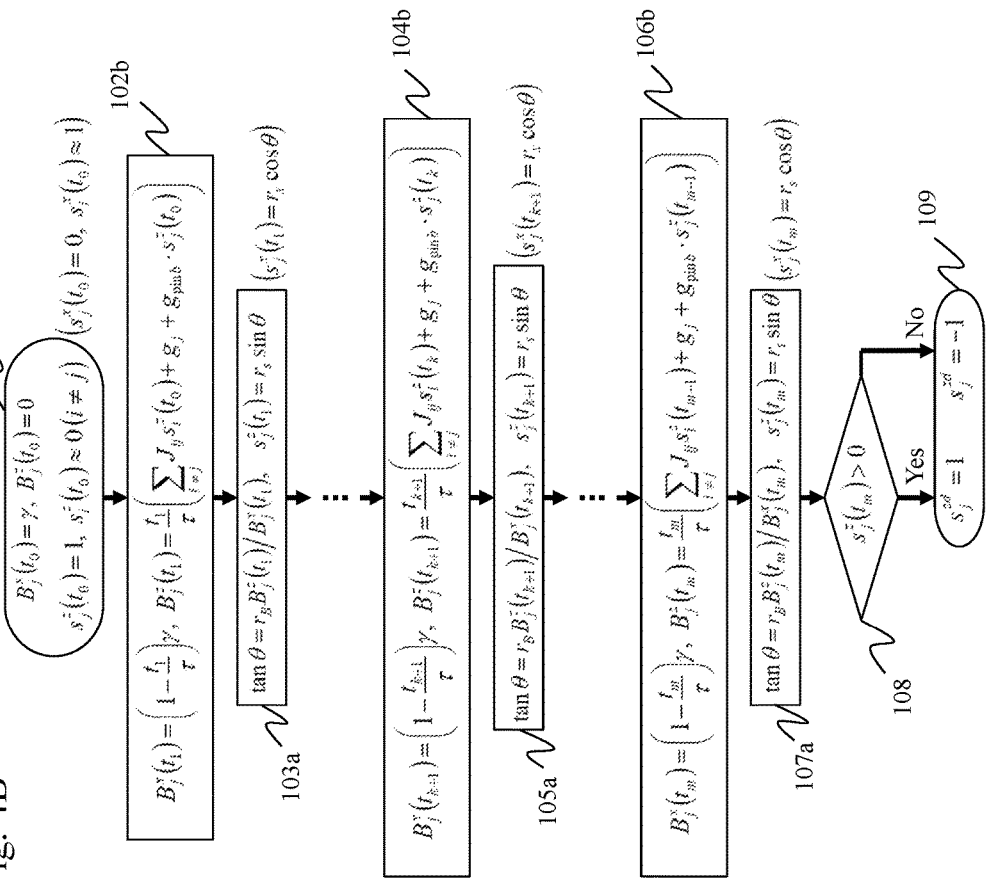
FIG. 4B is a diagram illustrating another example of algorithm according to Example 3 as a flowchart.
Figure 4C:
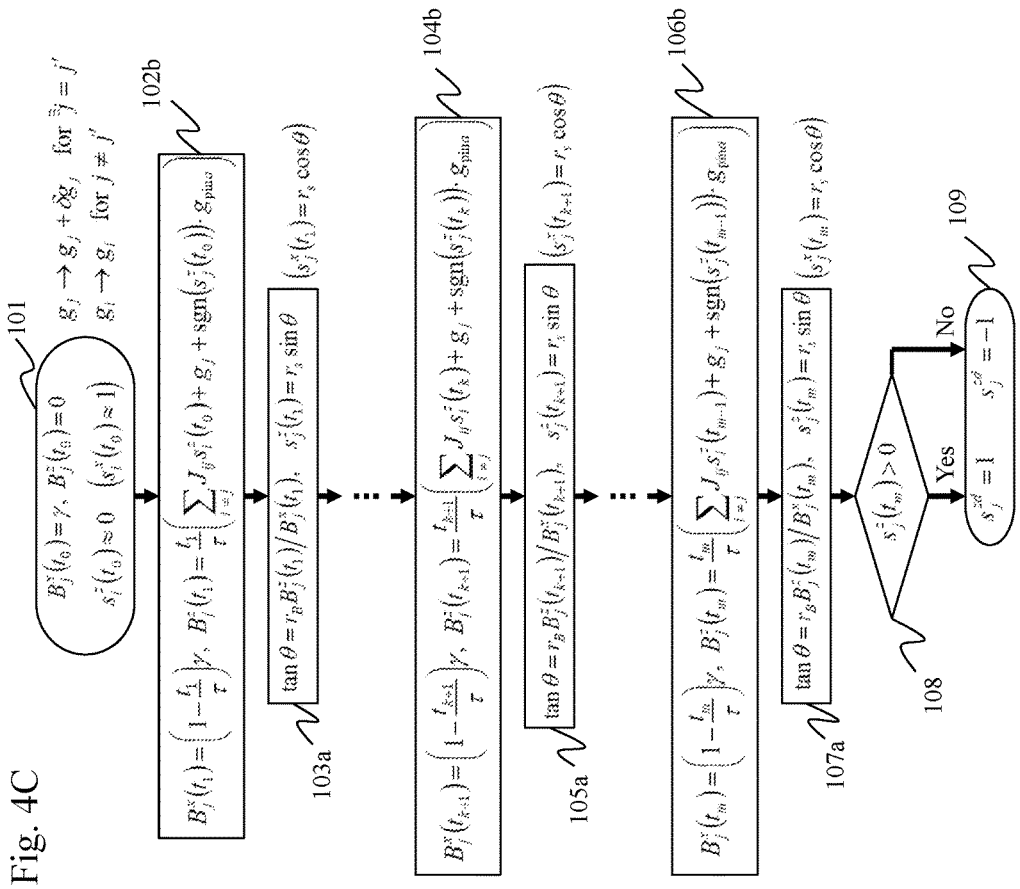
FIG. 4C is a diagram illustrating another example of algorithm according to Example 3 as a flowchart.
Figure 4D:
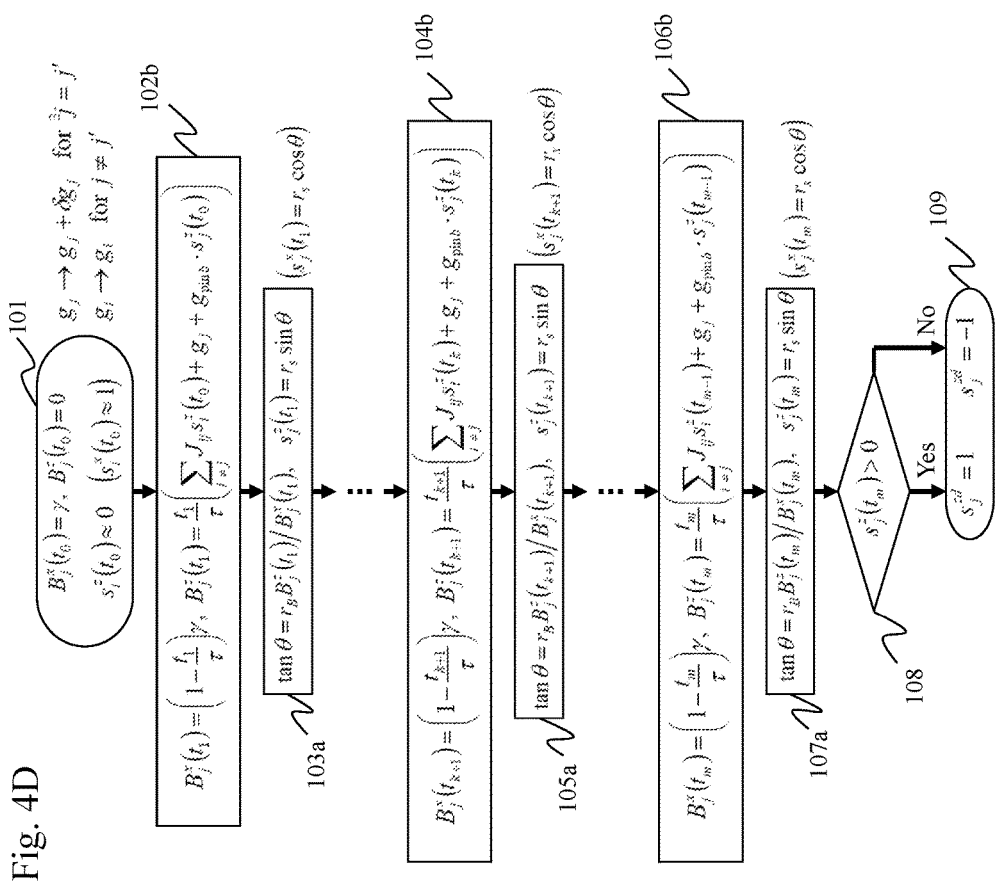
FIG. 4D is a diagram illustrating another example of algorithm according to Example 3 as a flowchart.
Figure 5A:
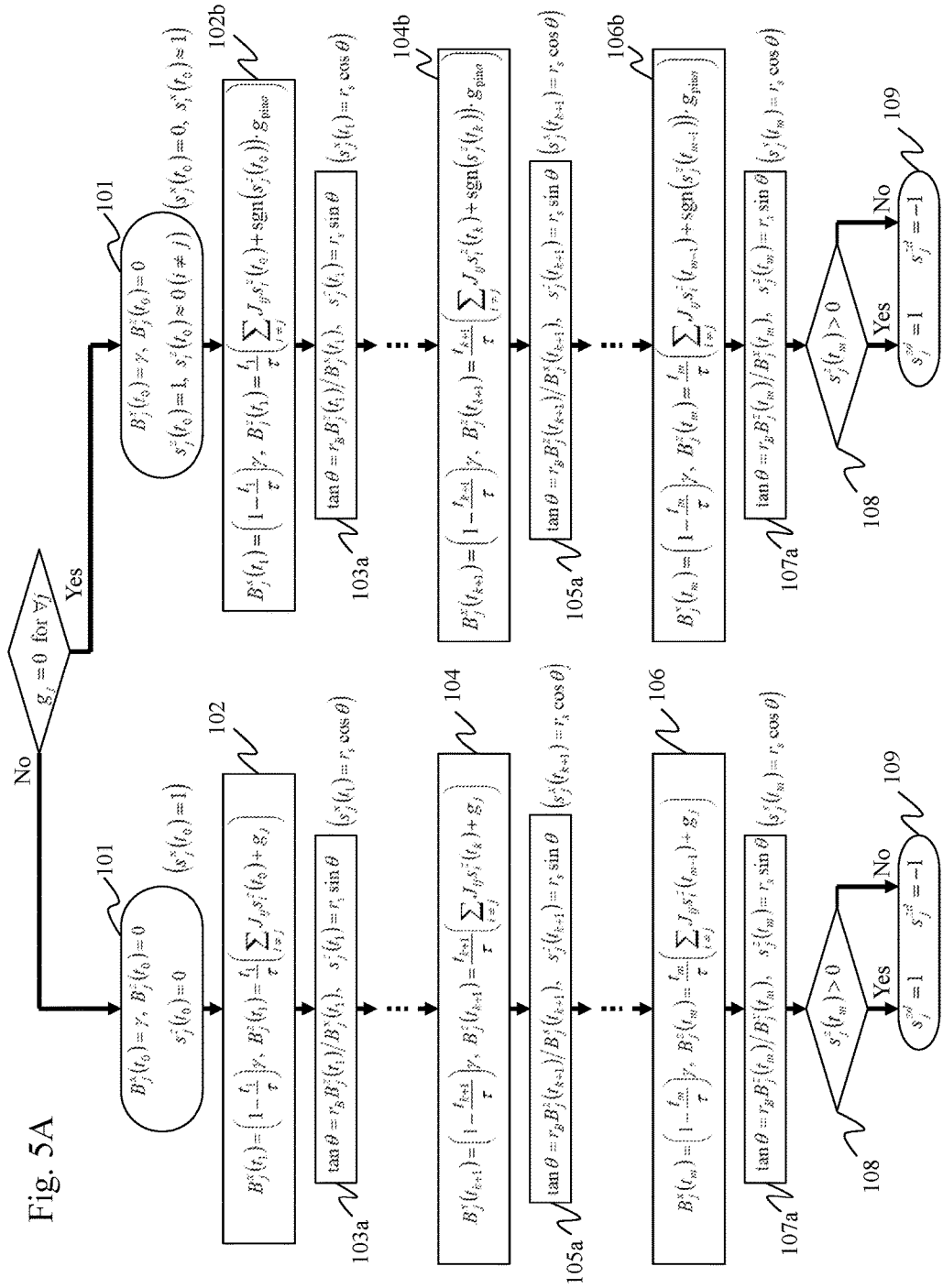
FIG. 5A is a diagram illustrating an example of algorithm according to Example 4 as a flowchart.
Figure 5B:
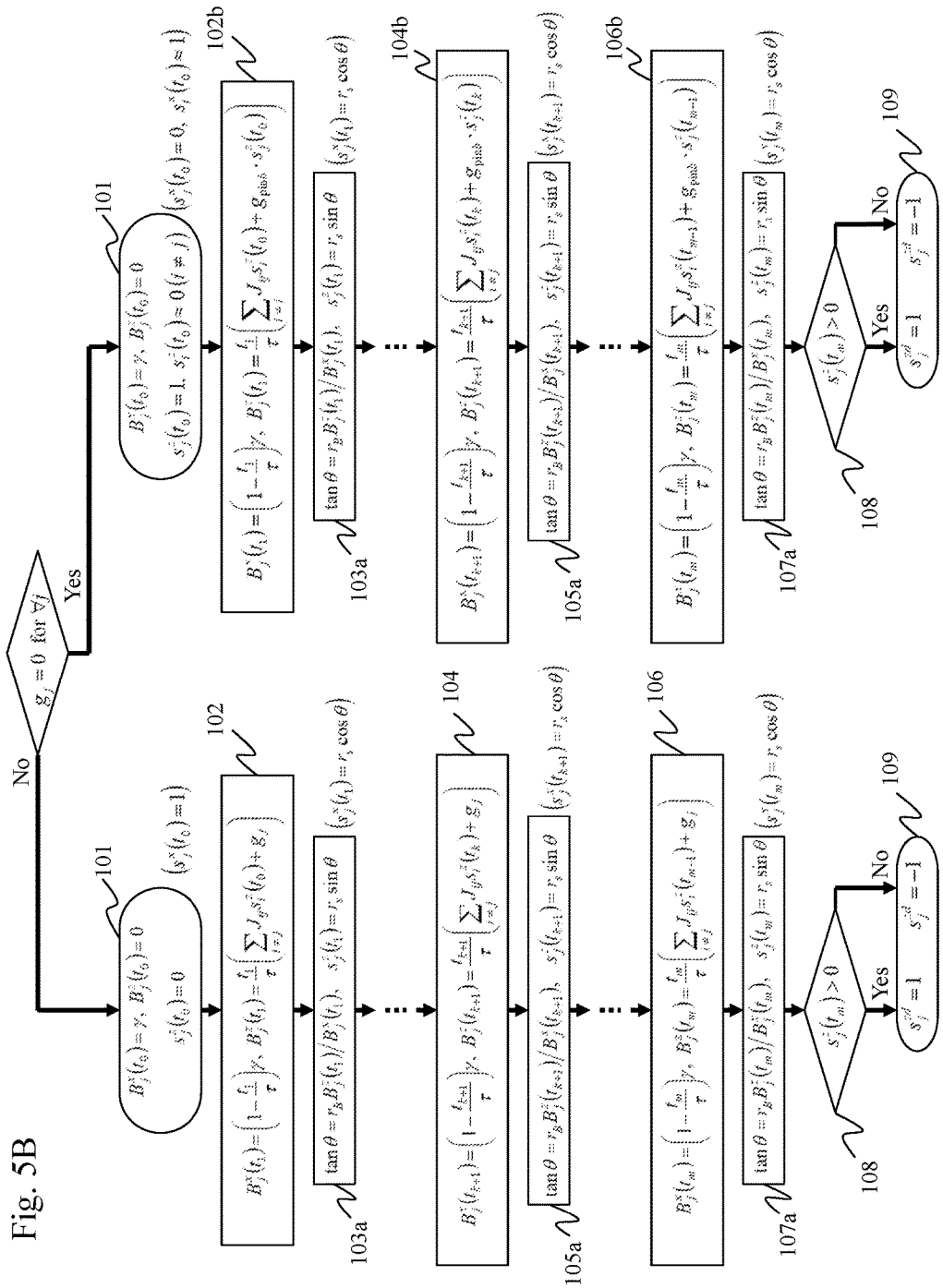
FIG. 5B is a diagram illustrating another example of algorithm according to Example 4 as a flowchart.
Figure 5C:
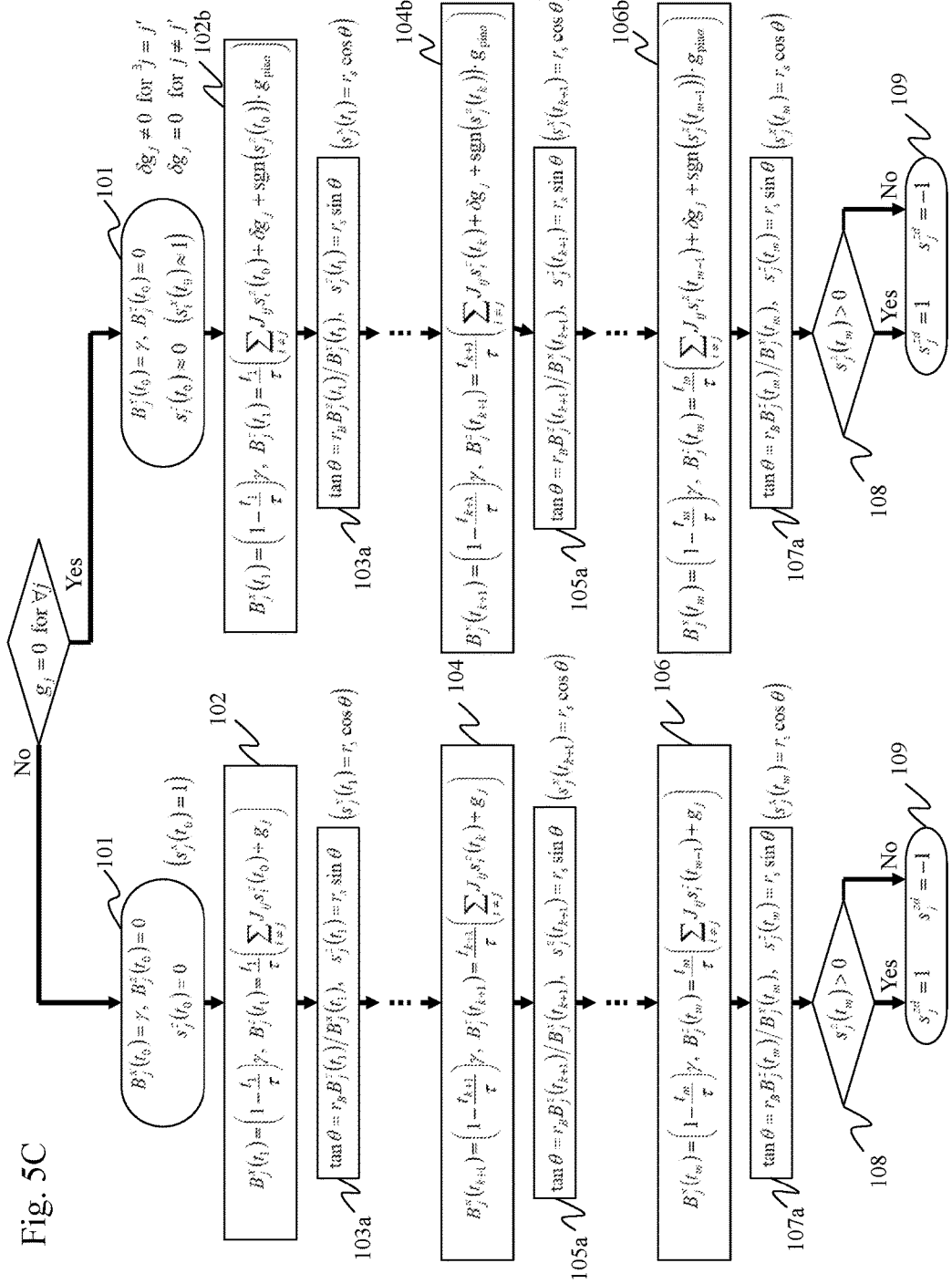
FIG. 5C is a diagram illustrating another example of algorithm according to Example 4 as a flowchart.
Figure 5D:
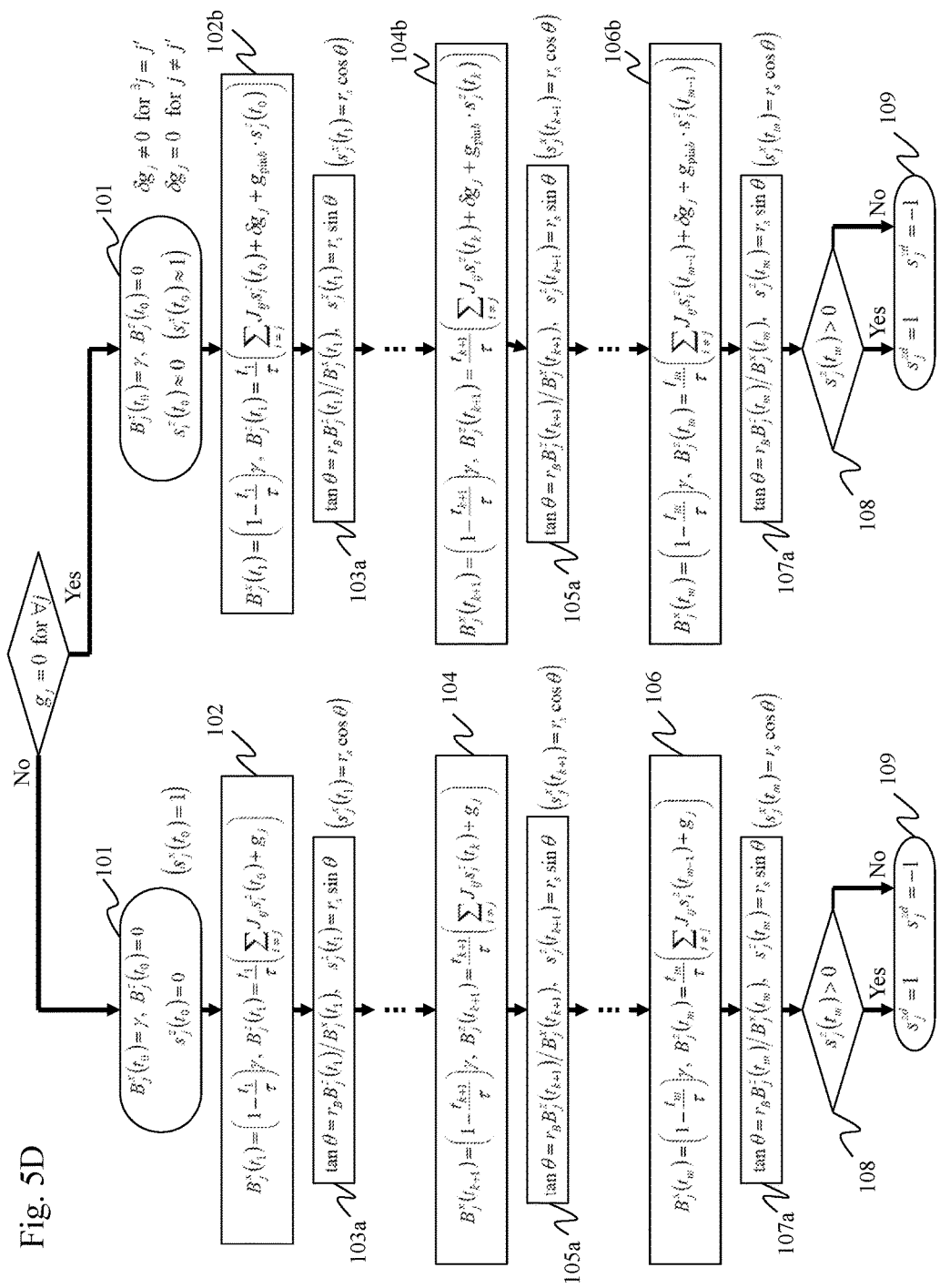
FIG. 5D is a diagram illustrating another example of algorithm according to Example 4 as a flowchart.

As described above, description was made on matters that setting of $s_j^z(t_0)=1$ and $s_i^z(t_0)=\sim 0$ ($i\neq j$) are made at $t=t_0$ as a method for inducing the computation to one solution in a case where the ground state is degenerated. In this method, a mandatory factor is only $s_j^z(t_0)=1$ at $t=t_0$. At $t>t_0$, only the history by the relaxation term is present and the mandatory factor is not present. It is effective to add the mandatory factor over all the time in order to further increase inductiveness to one solution. To do so, a method in which a local field term $\delta g_{j'}$ is additionally added only to one site j' is considered. That is, $\delta g_{j'}$ is added to the local field term $g_{j'}$ of Equations (12A) and (12B), which results in $g_{j'} \to g_{j'} + \delta g_{j'}$. Here, in two amounts of the right-hand side, the $\delta g_{j'}$ is assigned the same sign as the sign of $g_{j'}$, so as not to cancel each other. If it is originally $g_{j'}=0$, the sign of $\delta g_{j'}$ may be either positive or negative. The spin of j' site is strongly induced in a certain direction by the additional term. Although it is proper that $\delta g_{j'}$ is adjusted to be in a range of about from 10% to 100% of the average value of $|J_{ij}|$, one guide may be set to a range of about 50% of the average value of $|J_{ij}|$. Furthermore, since the mandatory factor is added through $\delta g_{j'}$, in this case, initial setting of $s_j^z(t_0)=1$ is not needed and $s_i^z(t_0)=\sim 0$ may be set for all sites. A flowchart for this case is illustrated in FIG. 4C and FIG. 4D. FIG. 4C corresponds to Equation (12A) and FIG. 4D corresponds to Equation (12B).

As described above, the relaxation term is added to thereby suppress vibration related to the direction of spin in time evolution and improve convergence of the solution. Furthermore, the relaxation term also has the following effects. In a case where the degeneration number of the ground state is large, there is a possibility that it is unable to determine whether which direction of the system orients is preferable in the ground state, the system falls into a state of $s_j^z=0$ which is the average value of a solution, and the system falls into a situation without escaping from the state. Here, only spin of one site (assumed as site j) is clearly determined ($s_j^z=1$ or $-1$) at an initial state and other spins are set as $s_k^z=\sim 0$ (k≠j, $s_k^x=\sim 1$), and a spin arrangement is determined by using the j site as a reference through spin interaction at an early stage of time evolution. Since the relaxation term is present, the direction of the j site is fixed and the reference is maintained at an early stage of the computation. For that reason, a good approximate solution corresponding to one of the degenerated solutions is implemented at an early stage of the computation and is induced to one of the degenerated solutions as it is. As such, the relaxation term increases the convergence of the solution and is converged to one of solutions in a case where the degeneration number is large. Furthermore, in a case where the degeneration number is large, there is also a second method as a method for causing the relaxation term to be converged to one of solutions. In Equations (12A) and (12B), the local field term $\delta g_{j'}$ is additionally added to the site j' of one solution to strongly induce only spin of j' site in a certain direction. With this, it is strongly induced to one of the degenerated solutions relative to the j' site set as a reference.

Example 4

In Example 3, description was made on matters that the convergence of the solution is improved by introducing the relaxation term. The relaxation term mainly exerts power on a case where all sites become $g_j=0$. If there is a term for which $g_j$ becomes $g_j \neq 0$, convergence is relatively good even without adding the relaxation term. When determination is made as to whether the relaxation term is to be added based on whether it is $g_j=0$ for all sites, it becomes an efficient computing method using only necessary terms.

FIG. 5 illustrates a flowchart of an example of algorithm for this case. FIG. 5A to FIG. 5D correspond to FIG. 4A to FIG. 4D, respectively.

Example 5

As understood from Equation (1) or the like described above, although the computation time is assumed as τ, there are several methods as a final solution determination method. Various solution determination methods will be described by using Example 5.

FIG. 6 is a diagram illustrating the flowchart of an example of algorithm related to the final solution determination method.

Figure 6A:
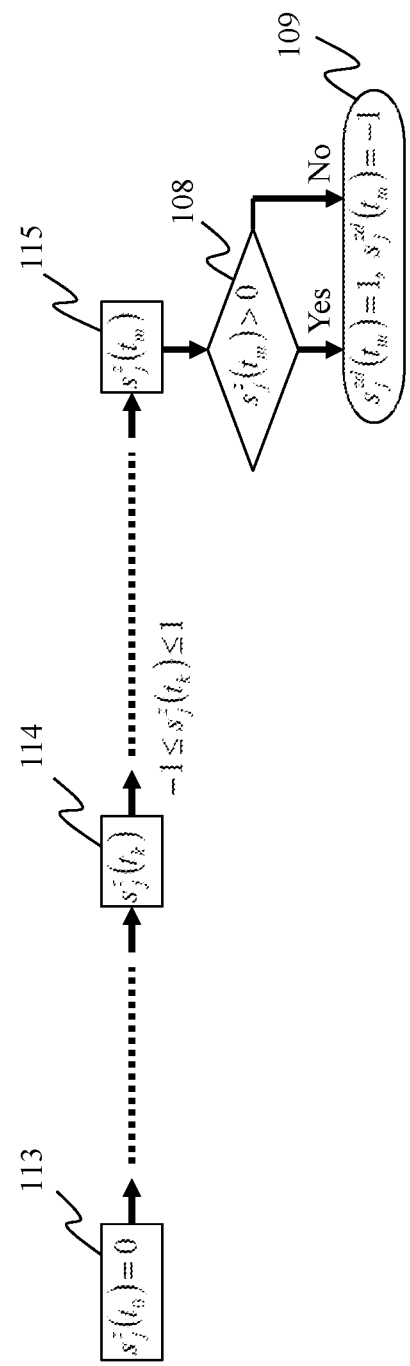
FIG. 6A is a diagram illustrating an example of algorithm related to a final solution determination method according to Example 5 as a flowchart.

In the first method, if $s_j^z>0$, then $s_j^{zd}=1$ and if $s_j^z<0$, then $s_j^{zd}=-1$ at t=τ(t=$t_m$) (115), as illustrated in FIG. 6A. The flowchart of each example of FIG. 2 to FIG. 5 describes this case and the flowchart focused only on a solution determination method corresponds to FIG. 6A.

Figure 6B:
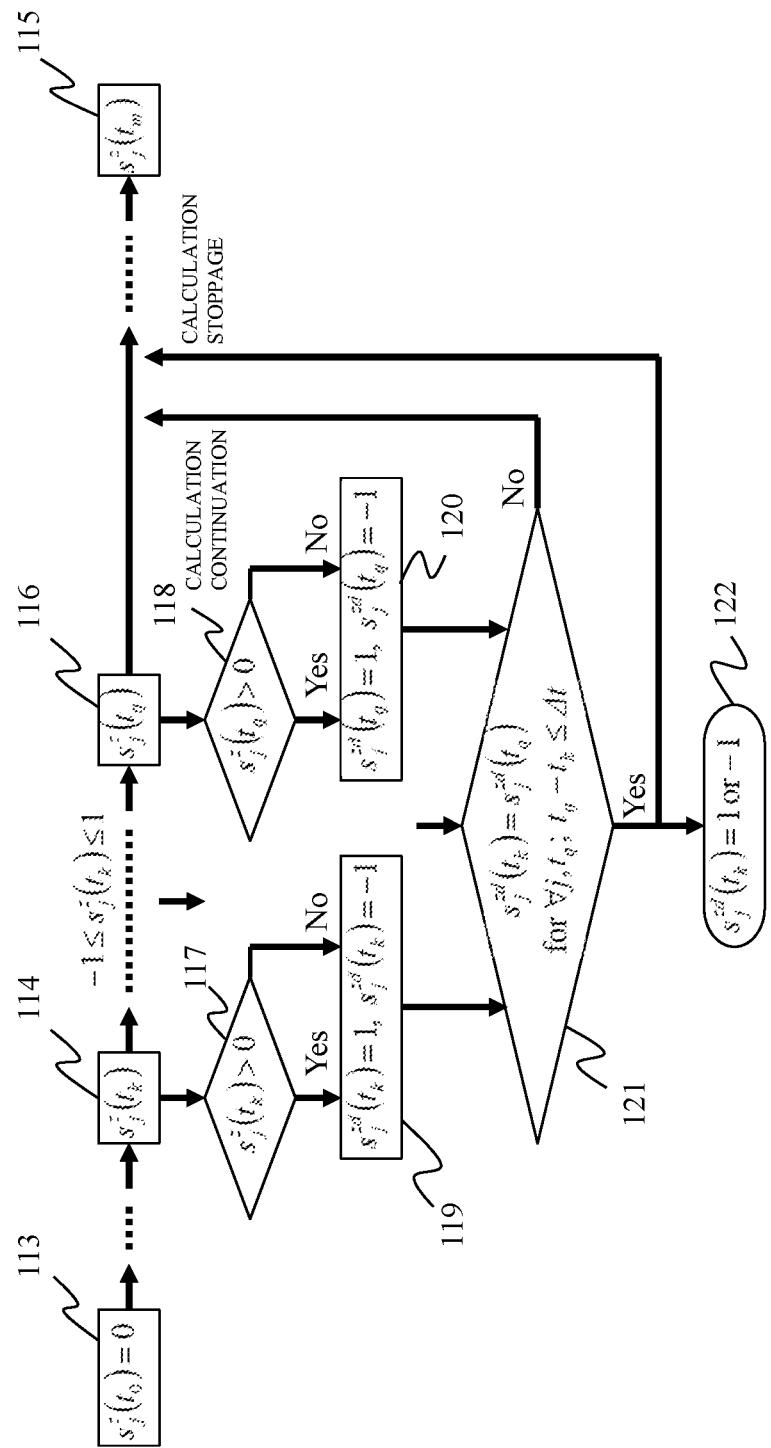
FIG. 6B is a diagram illustrating another example of algorithm related to the final solution determination method according to Example 5 as a flowchart.

In the second method, as illustrated in FIG. 6B, convergence of $s_j^z$ is seen and thus, if the sign of $s_j^z$ is not changed for all time $t_q$ during a sufficient period of time Δt after a certain time $t_k$ (121), it is determined, based on the sign $s_j^z$ at that time, that $s_j^{zd}=1$ or $-1$ (122).

Figure 6C:
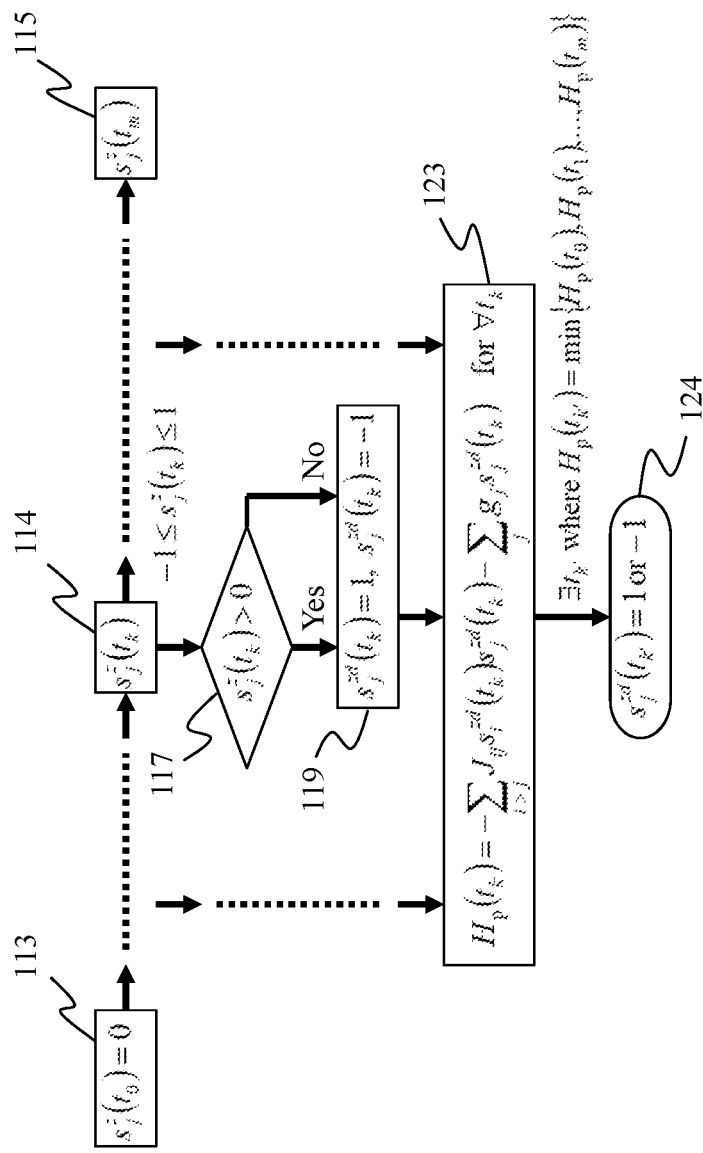
FIG. 6C is a diagram illustrating another example of algorithm related to the final solution determination method according to Example 5 as a flowchart.

In the third method, as illustrated in FIG. 6C, although the computation continues until t=τ (t=$t_m$), similar to the first method (115), energy at each stage is obtained based on Equation (3). Since eigenvalues of $\hat{\sigma}_j^z$ of Equation (3) are ±1, it is determined whether eigenvalue of $\hat{\sigma}_j^z$ is 1 or −1, according to the sign of $s_j^z$ at each stage in the computation process. That is, if $s_j^z(t_k)>0$, then eigenvalue of $\hat{\sigma}_j^z$ is 1 ($s_j^{zd}=1$) and if $s_j^z(t_k)<0$, then eigenvalue of $\hat{\sigma}_j^z$ is −1 ($s_j^{zd}=-1$). Calculating using eigenvalue of $\hat{\sigma}_j^z$ is in regards to energy and $s_j^z(t_k)$ ($-1<=s_j^z(t_k)<=1$) is used in the computation process. At the time when it reaches t=τ (t=$t_m$), energy at respective times $t_k$ is compared and the final solution is determined based on the sign of $s_j^z(t_{k'})$ at time $t_{k'}$ at which the lowest energy is obtained.

That is, by assuming that if $s_j^z(t_k)<0$ at each time $t_k$, then $s_j^{zd}(t_k)=-1$, and otherwise, if $s_j^z(t_k)>0$, then $s_j^{zd}(t_k)=1$ (119), $H_p(t_k)=-\Sigma_{i>j}J_{ij}s_i^{zd}(t_k)s_j^{zd}(t_k)-\Sigma_j g_j s_j^{zd}(t_k)$ is calculated at each time $t_k$ (123), and it is assumed that $s_j^{zd}(t_{k'})$ at time $t_{k'}$, at which $H_p(t_k)$ became the minimum value, is the final solution (124).

Figure 6D:
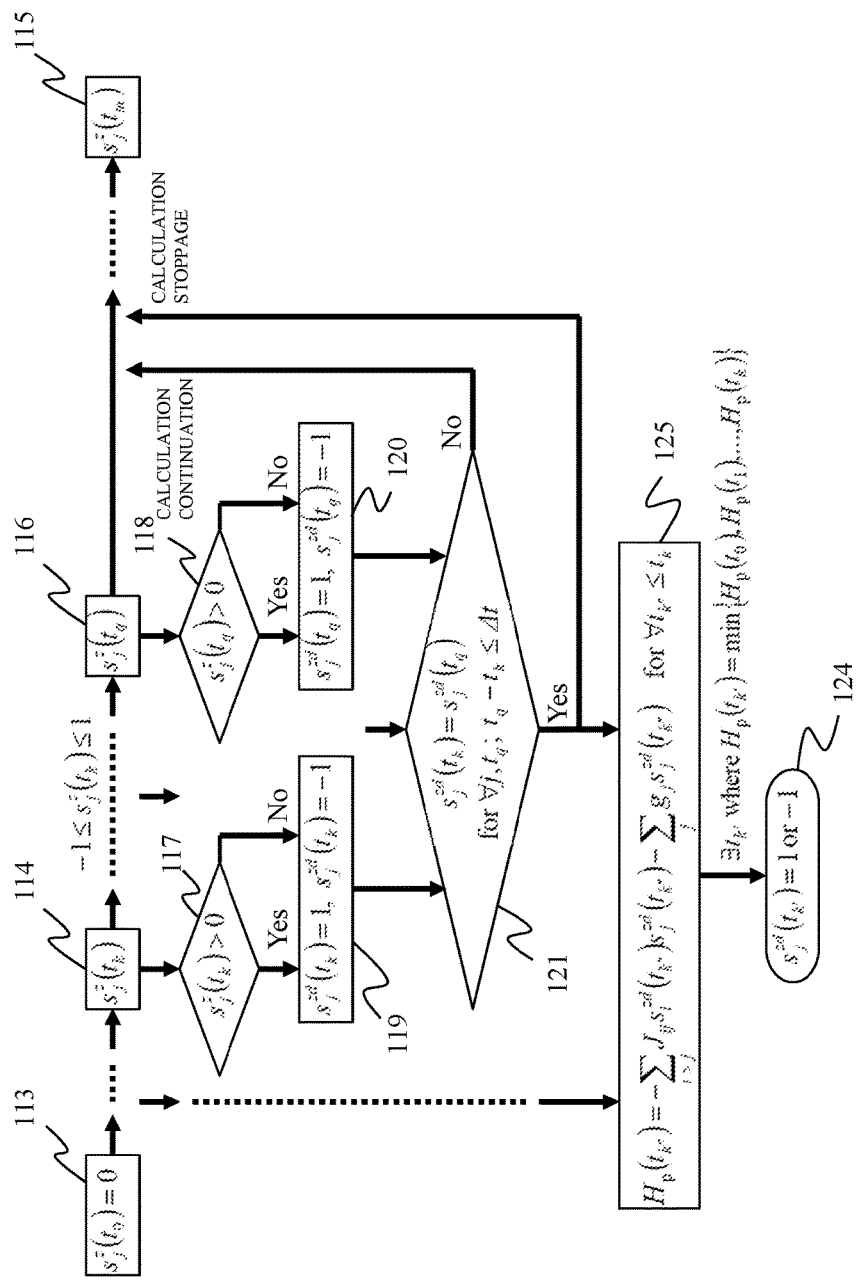
FIG. 6D is a diagram illustrating another example of algorithm related to the final solution determination method according to Example 5 as a flowchart.

In the fourth method, as illustrated in FIG. 6D, the computation is stopped at a stage where all $s_j^z$ are converged, similar to the second method. However, the final solution is not determined from $s_j^z$ at a time-point where the computation is stopped, energy at each time is calculated similar to the third method, and the final solution is determined from $s_j^z(t_{k'})$ at time when the lowest energy was given (125). Whether to take any of the methods will be decided by the user.

Example 6

The example in which the time axis is discretely set as illustrated in FIG. 1 was described. Although a continuous change is ideal and thus fine time intervals are appropriate, if the time intervals are taken too finely, the computation time becomes longer. Changing time intervals in accordance with the progress of the computation is considered.

Important time in the computation process is time when the sign of $s_j^z$ changes. The change in the sign of $s_j^z$ is relatively small near the start or end of the computation and the change in the sign of $s_j^z$ is violent in an intermediate stage of the computation. As the first method, there is a setting method in which the time interval is programmatically set to be larger at the start of computation, the time interval is decreased over time, and then the time interval is increased.

In the second method, a possibility of spin reversal is evaluated at each time and the time interval is set based on the evaluation. For example, it becomes as follows. If the sizes of $|s_j^z|$ are roughly equal at all spins, the possibility of occurrence of spin reversal is low. In this case, the time interval is increased. On the other hand, if a size of $|s_j^z|$ of a specific spin is smaller than other spins, a probability that spin reversal occurs is high. In this case, the time interval is decreased. One specific example of a time interval determination is as follows. The minimum time interval is set as $\delta t_{min}$. A mean square of spins of all sites at time $t_k$ is set as $s_{ave}(t_k)^2$, and the size of square of the minimum spin is set as $s_{min}(t_k)^2$. That is, $s_{ave}(t_k)^2 = \Sigma_j (s_j^z(t_k))^2/N$, $s_{min}(t_k)^2 = \min s_j^z(t_k)^2$. [x] is set to $\Delta T_{k+1,k} = t_{k+1} - t_k = \delta t_{min} \times \max(1, [100 \times (s_{min}(t_k)^2/s_{ave}(t_k)^2)^{1/2}])$ as the maximum integer which is less than or equal to x. In a case of this example, the minimum value of the time interval becomes $\sigma t_{min}$ and the maximum value of the time interval becomes $100 \cdot \delta t_{min}$.

Whether to take any of the methods will be decided by the user.

Example 7

In Example 3, the site j was selected and $s_j^z(t_0)$ was set as $s_j^z(t_0)=1$ and $s_i^z(t_0)=\sim 0$ ($i \neq j$). Since the site j is optional, it is possible to solve the same problem by changing selection of the site j. In this way, if an optimum solution, which is attained by repeatedly solving the same problem, is selected, the correct answer rate is improved.

Example 8

In Examples 1 to 7, description was made on a computation principle and computation algorithm. In Example 8, first, description will be made on a configuration example of a computer which causes algorithm to be operated as a program.

Figure 7:
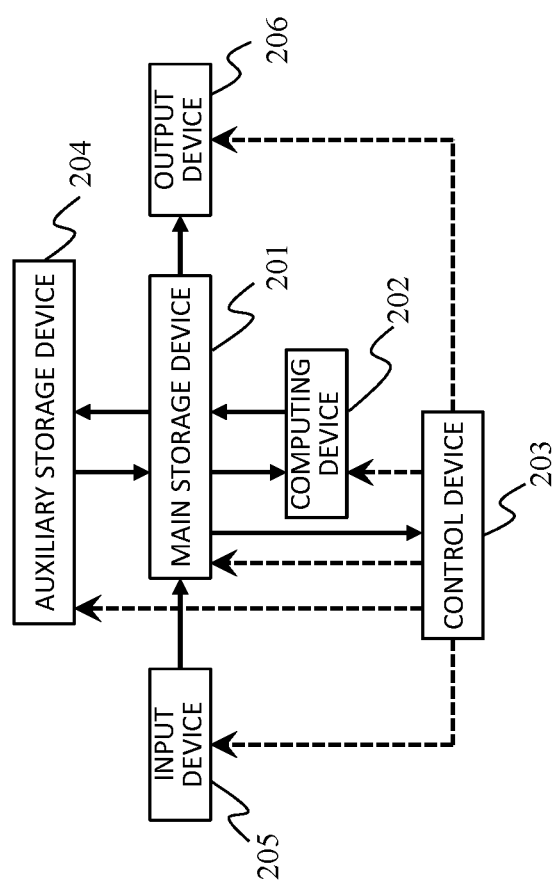
FIG. 7 is a block diagram illustrating a configuration example of a computer, according to Example 8.

FIG. 7 illustrates an example of a computer configuration of the present example. The configuration illustrated in FIG. 7 is basically the same as a normal computer, and data is transferred from a main storage device 201 which is a storing unit to a computing device 202 which is a computing unit and after the computation, data is returned to the main storage device 201. The computation proceeds by repeating the transfer and return of data. The control tower for this case is a control device 203 as a control unit. The computation in the present example is executed by the computing device 202 by time and per a site according to a flow of FIG. 2 to FIG. 5.

The program executed by the computing device 202 is stored in the main storage device 201 which is the storing unit. In a case where a storage capacity of the main storage device 201 is not enough, an auxiliary storage device 204 which is the same storing unit is used. An input device 205 is used for inputting data, the program, and the like and an output device 206 is used for outputting a result. The input device 205 includes an interface for network connection in addition to a manual input device such as a keyboard. The interface also serves as the output device. Although the algorithm described in Examples 1 to 7 as the program is applied to the configuration of FIG. 7, a normal computer is used as the apparatus itself.

On the other hand, there is also a method in which the computation principle and algorithm described in Examples 1 to 7 are used, including execution of the program as well as an apparatus configuration.

Figure 8:
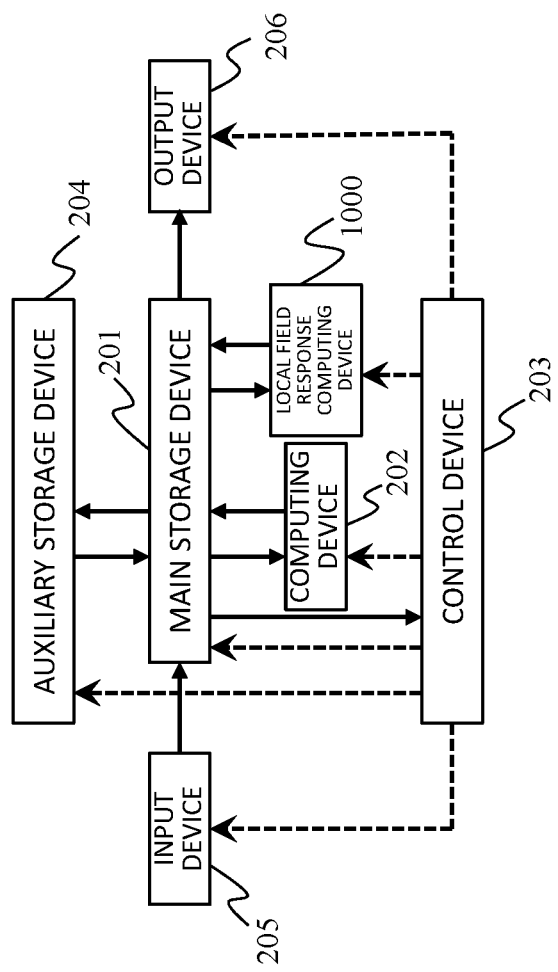
FIG. 8 is a block diagram illustrating another configuration example of the computer, according to Example 8.

FIG. 8 illustrates a configuration diagram in which those matters described above are realized. A local field response computing device 1000 is included as the computing unit. This is a difference in comparison with the configuration of FIG. 7. The local field response computing device 1000 is a dedicated computing unit for conducting the algorithm described above and executes only the local field response computation described in Examples 1 to 7, and a general process is conducted by the computing device 202. Information used by the local field response computing device 1000 is transferred from the main storage device 201.

As information that is needed, there are a time parameter $t_k$, correction parameters $r_s$ and $r_B$ related to quantum entanglement, coefficients $g_{pina}$ and $g_{pinb}$ of the relaxation term, and the like, in addition to the problem to be set parameters called intervariable interaction $J_{ij}$ and the local field $g_j$. Processing which takes, for example, synchronization is a role of the control device 203 similar to the computer of the configuration of FIG. 7. Information of progress as well as the final result is transferred from the local field response computing device 1000 to the main storage device 201 at each time parameter $t_k$, as needed, according to an instruction of the control device 203. In an intermediate stage of computation, a transferred value from the local field response computing device 1000 is used in, for example, the calculation of energy of the Ising spin and Hamiltonian at an intermediate stage of computation or evaluation of $s_{min}(t_k)^2$ and $s_{ave}(t_k)^2$.

In the third and fourth method described in Example 5, as illustrated in FIG. 6C and FIG. 6D, the final solution is determined by using the value of energy of the Ising spin and Hamiltonian at an intermediate stage of computation. If it is determined whether $s_j^{zd}$ is +1 or −1, the calculation of energy of the Ising spin and Hamiltonian is simple one and a normal computing device 202 is used. The local field response computing device 1000 is a dedicated computing unit for the local field response computation described in Examples 1 to and the normal computing device 202 is used for other processing.

Example 9

The local field response computing device 1000 described in Example 8 can be realized by various methods. In the present example, a method for efficiently using parallelism of light will be described first.

Figure 9:
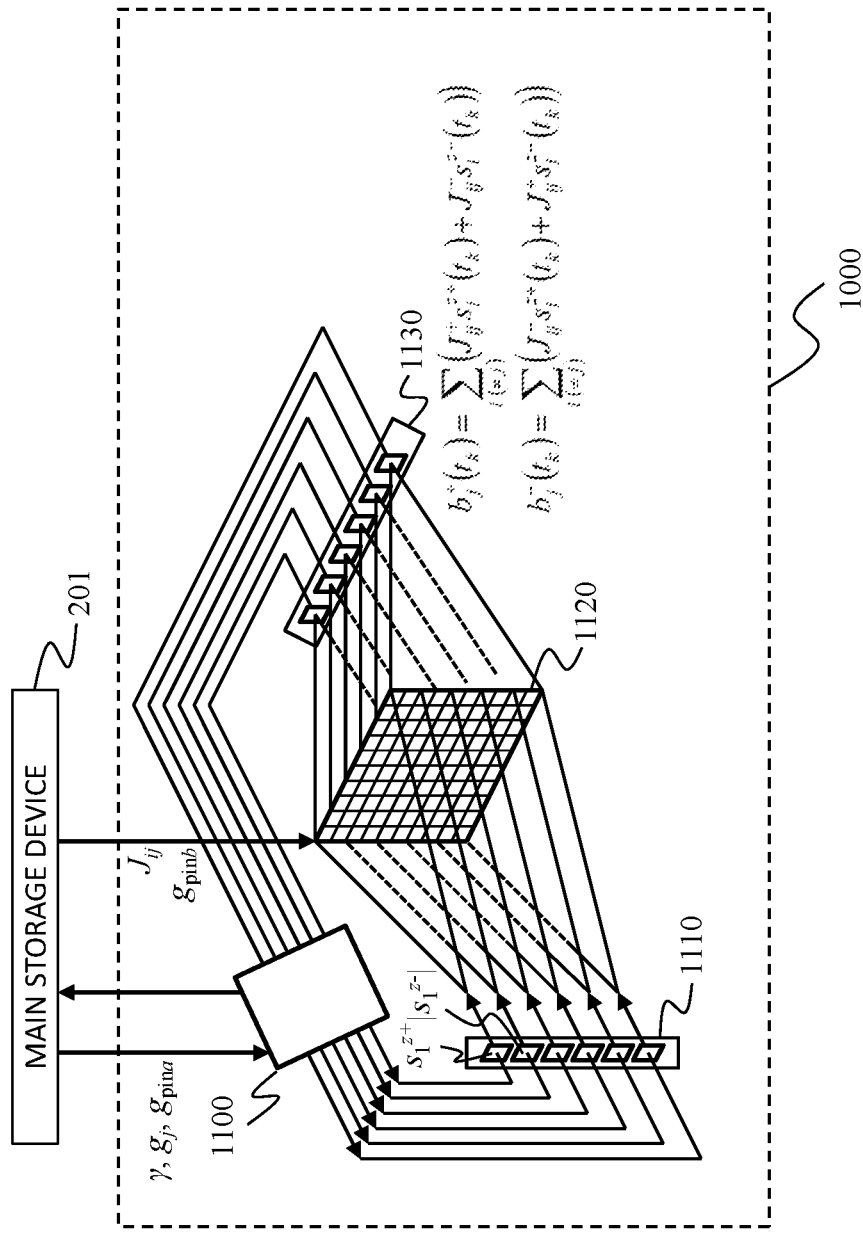
FIG. 9 is a configuration diagram illustrating a configuration example of a local field response computing device included in a computer, according to Example 9.

FIG. 9 illustrates an entire image. Information such as $\gamma$, $g_j$, and $g_{pina}$ needed for computation is sent from the main storage device 201 to the control unit 1100 and information of $J_{ij}$ is sent from the main storage device 201 to a variable mask 1120. $g_{pinb}$ in a case of being corresponded to Equation (12B) is sent to the variable mask 1120 and $J_{ii}$ is set as $J_{ii}=g_{pinb}$. Output intensity of an LED array 1110 is assumed to reflect a value of the variable $s_j^z$. In the present example, only intensity information of light is used and phase information is not used. For that reason, an incoherent light source such as an LED array is used as a light source 1110. Although it is possible to use an LD which is coherent, in such a case, measurement time in a detector array 1130 is taken to be sufficiently long so as not to make interference effect between output light beams of an LD array appear. Output light beams from the LED array 1110 extend only the lateral direction, attenuate light quantity according to $J_{ij}$ in the variable mask 1120, and then make the longitudinal direction converge to be converted into an electrical signal in a detector array 1130.

Figure 10:
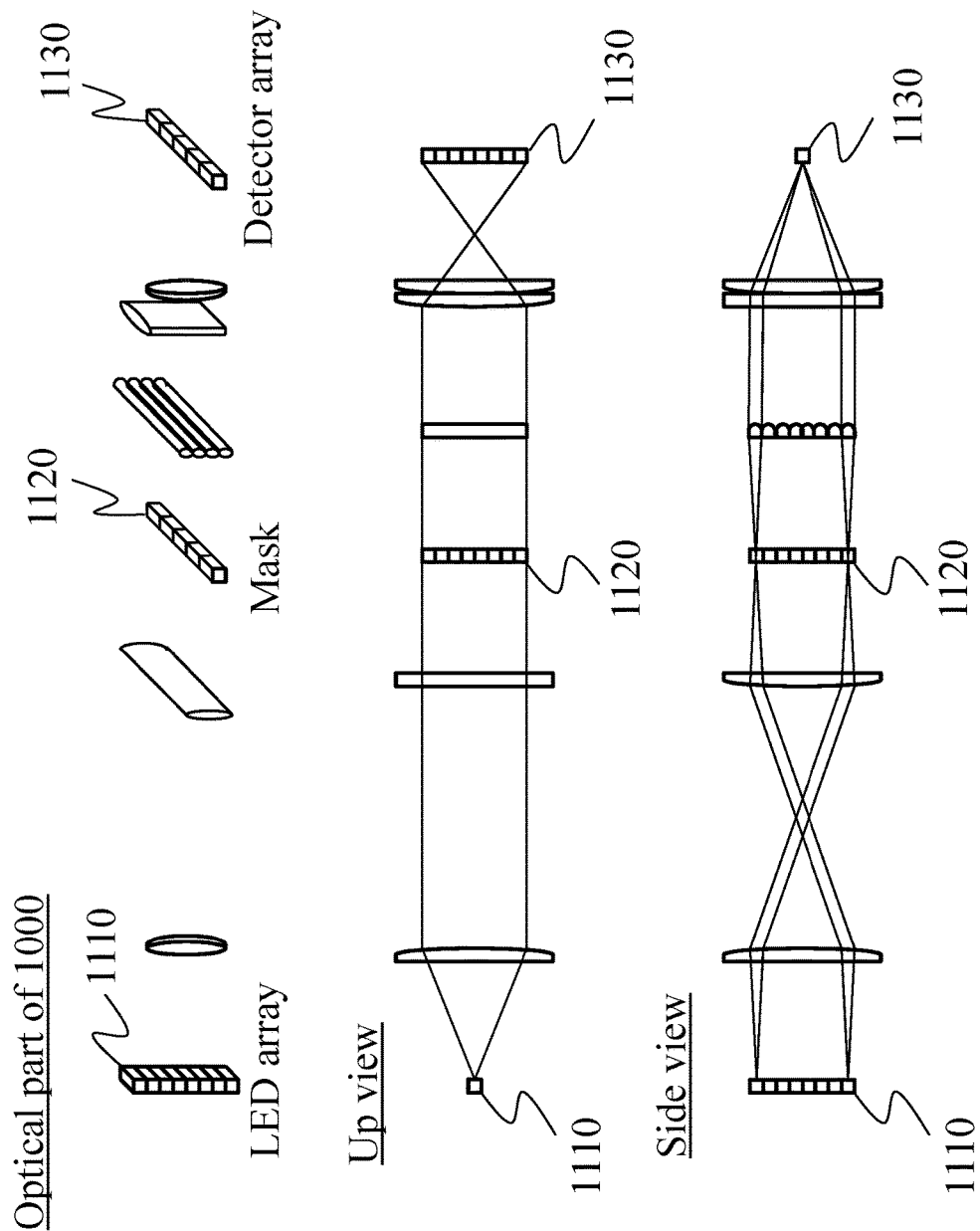
FIG. 10 is a configuration diagram illustrating a configuration example of an optical part of FIG. 9.

FIG. 10 is a configuration diagram illustrating a configuration example of an optical part of FIG. 9. An optical system spanning from the LED array 1110 to the detector array 1130 uses, for example, a lens system of FIG. 10.

Although the variable $s_j^z$ takes a value of [−1, 1], an output of the light source is not able to take a negative value. Accordingly, it is assumed that $s_j^z$ is represented in a pair of two LEDs in the LED array 1110. That is, it is assumed that for $s_j^z>0$, $s_j^z$ is set as $s_j^{z+}=s_j^z$ and $s_j^{z-}=0$ and for $s_j^z<0$, $s_j^z$ is set as $s_j^{z+}=0$, and $s_j^{z+}=s_j^z=-|s_j^z|$, one of the LED output is set as $s_j^{z+}$, the other is set as $|s_j^{z-}|$, and thus, $s_j^z$ is represented by a difference of both outputs $s_j^z=s_j^{z+}-|s_j^{z-}|=s_j^{z+}+s_j^{z-}$. The detector array 1130 is also assumed to represent in a pair of two detectors in association with the light source side. With this, it is possible to correspond to the variable mask 1120 which is unable to take a negative value. A signal intended to be obtained in the detector array 1130 is $b_j^z \equiv \Sigma_i J_{ij} s_i^z$. Similar to $s_j^z$, if $J_{ij}=J_{ij}^++J_{ij}^-=J_{ij}^+-|J_{ij}^-|$, it becomes that $b_j^z=\Sigma_i J_{ij} s_i^z = \Sigma_i (J_{ij}^+ + J_{ij}^-)(s_i^{z+} + s_i^{z-}) = \Sigma_i (J_{ij}^+ s_i^{z+} + J_{ij}^- s_i^{z-}) + \Sigma_i (J_{ij}^+ s_i^{z-} + J_{ij}^- s_i^{z+})$. Each of pairs of two detectors of the detector array 1130 detects $b_j^{z+}=\Sigma_i(J_{ij}^+ s_j^{z+}+J_{ij}^- s_j^{z-})$ and $|b_j^{z-}|=\Sigma_i(J_{ij}^+ |s_j^{z-}|+|J_{ij}^-|+|J_{ij}^-| s_j^{z+})$ and $b_j^z=b_j^{z+}-|b_j^{z-}|=b_j^{z+}+b_j^{z-}$ obtained by taking a difference between the detectors becomes the signal. Furthermore, as described above, if $J_{ii}$ is set as $J_{ii}=g_{pinb}$ it corresponds to Equation (12B).

If $b_j^z$ is obtained, $B_j^z$ based on Equation (10) or Equations (12A) and (12B) is obtained by adding $g_j$ and $g_{pina}$ terms. This calculation is performed by the control unit 1100. A calculation to obtain $s_j^z$ from $B_j^z$ is performed by the control unit 1100 and the value of $s_j^z$ is sent to the LED array 1110. Like this, 1 step spanning from time $t_k$ to $t_{k+1}$ is ended. Furthermore, the control unit 1100 is intended to repeat same processing and is a dedicated circuit for that. $s_j^z$ at each time is transferred to the main storage device 201 to be used for analysis.

Example 10

In the example of FIG. 9, an optical system spanning from the LED array 1110 to the detector array 1130 was free space. It can also be realized by an optical system in which a waveguide is used for that portion.

Figure 11:
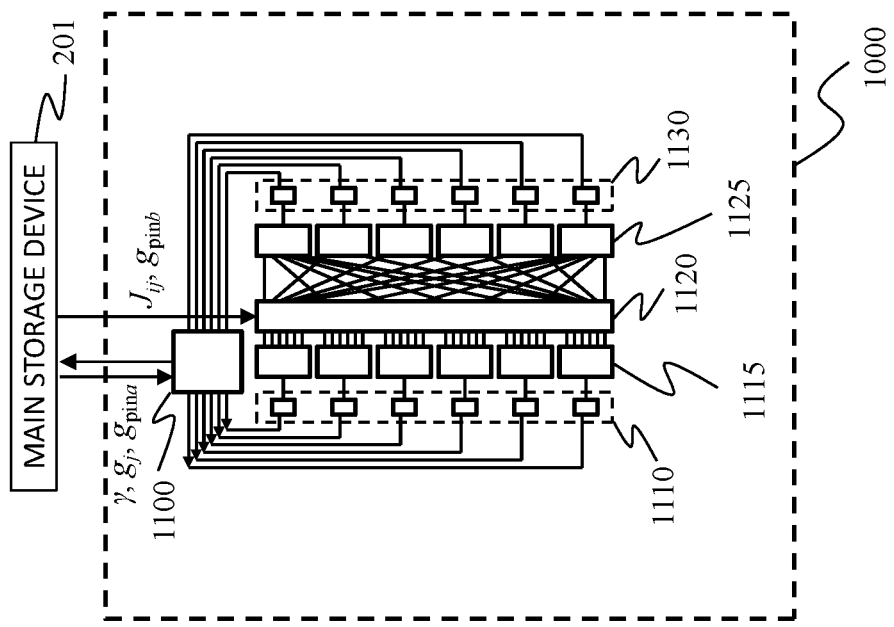
FIG. 11 is a block diagram illustrating a configuration example of a local field response computing device included in a computer, according to Example 10.

FIG. 11 illustrates that case. Light beams output from the LED array (LD array) 1110 are divided by a demultiplexer 1115, are transmitted through the variable attenuator 1120 (variable mask in FIG. 9) in which transmittance is set based on $J_{ij}$, and then, are condensed by a multiplexer 1125 to be received by the detector array 1130. In FIG. 9, only a spatial optical system is changed to a waveguide optical system and an operation principle is the same. Accordingly, the LED array (LD array) 1110 represents the $s_j^z$ in a pair of two LEDs and the detector array 1130 also operates in a pair of two detectors.

Example 11

In Example 9 and Example 10, $s_j^z$ was represented in a pair of two light sources. If $s_j^{z+}$ and $s_j^{z-}$ are represented by using polarization, a single light source can be used for $s_j^z$.

Figure 12:
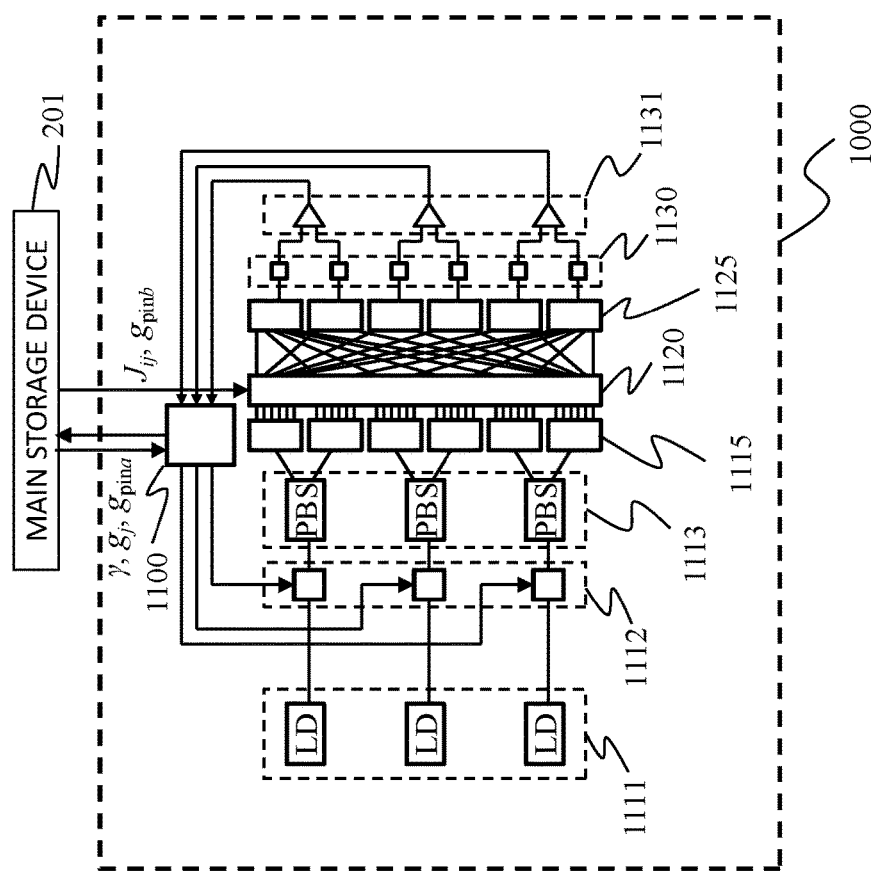
FIG. 12 is a block diagram illustrating a configuration example of a local field response computing device included in a computer, according to Example 11.

FIG. 12 illustrates that case. Each of the LDs within a light source 1111 is for representing $s_j^z$. Distribution intensity to two polarized waves is adjusted by a polarized wave modulator 1112. If $s_j^{z+}$ is set as $s_j^{z+}=A\sin(\pi/4+\theta)$ and $|s_j^{z-}|=A\cos(\pi/4+\theta)$, $s_j^z=s_j^{z+}+s_j^{z-}=s_j^{z+}-|s_j^{z-}|=\sqrt{2}A\sin\theta$ and if $\theta$ is set as $\theta<<1$, $s_j^z=\sqrt{2}A\theta$. If a range of $\theta$ is set as $-\theta_{max}<=\theta<=\theta_{max}$, $-1<=s_j^z<=1$ is satisfied by $A=1/(\sqrt{2}\theta_{max})$ and selection. The polarized wave modulator 1112 modulates $\theta$ in $s_j^{z+}=A\sin(\pi/4+\theta)$ and $|s_j^{z-}|=A\cos(\pi/4+\theta)$. Light beams which are polarization modulated are polarization separated by a polarization separator 1113 and are guided to the demultiplexer 1115. A portion spanning from the demultiplexer 1115 to the detector 1130 operates similarly to that of FIG. 11. Similar to FIG. 11, the detector 1130 operates in a pair of two detectors and thus a difference signal is taken by the differential amplifier 1131 and difference signal is set as $B_j^z=\Sigma_i J_{ij} s_i^z$. Thereafter, signal processing similar to the case of Example 9 where the signal is sent to the control unit 1100 is performed, a signal advanced by 1 step is sent to the polarized wave modulator 1112 and progression to the next step is performed.

In the present example, $s_j^z=\sqrt{2}A\sin\theta$ was set as $s_j^z=\sqrt{2}A\theta$ by setting $\theta$ as $\theta<<1$. Here, if $\theta$ is set as $\theta=\arcsin\varphi$, $s_j^z$ becomes that $s_j^z=\sqrt{2}A\varphi$ without imposing a condition of $\theta<<1$. That is, an input signal to the polarized wave modulator 1112 is adjusted to thereby make it possible to maintain linearity. In Example 2, description was made on matters that $r_B$ is shifted from $r_B=1$ to $r_B=\sim0$ according to time variation from $t=0$ to $t=\tau$. In this case, a functional form of $\theta=\arcsin\varphi$ is further deformed.

Example 12

The local field response computing device 1000 may also be realized by an electrical circuit as well as the method using light as in Examples 9 to 11.

Figure 13:
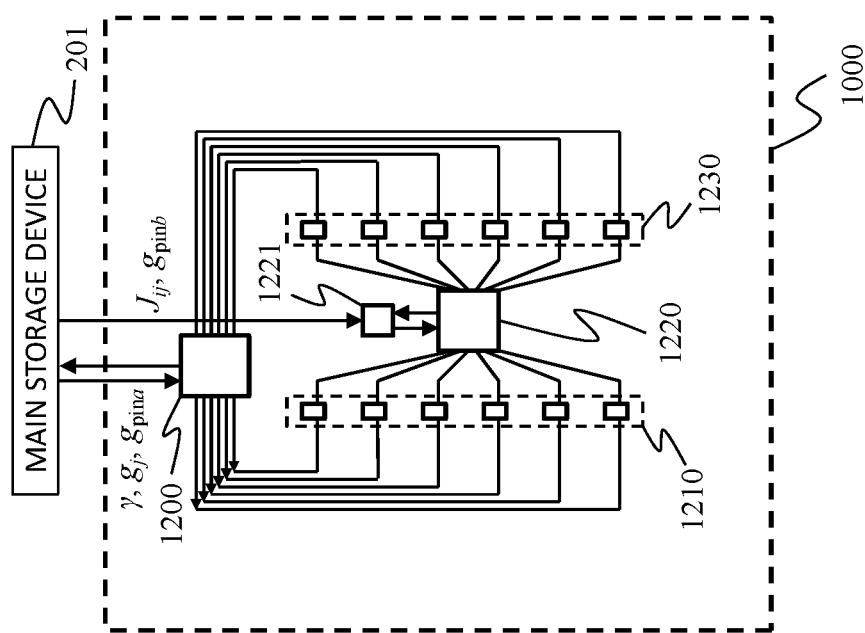
FIG. 13 is a block diagram illustrating a configuration example of a local field response computing device included in a computer, according to Example 12.

FIG. 13 illustrates a configuration example for that case. Information of each spin $s_i^z$ waits temporarily in a buffer array 1210. Information of $J_{ij}$ is held in a memory 1221. $g_{pinb}$ in a case of being corresponded to Equation (12B) is held in the memory 1221 and $J_{ii}$ is set as $J_{ii}=g_{pinb}$. In the computing component 1220, $B_j^z=\Sigma_i J_{ij} s_i^z$ is sequentially calculated based on information of $s_i^z$ that waits in the buffer array 1210 and information of $J_{ij}$ of the memory 1221 and is transferred to a buffer array 1230 and is saved. Thereafter, a signal is transferred to the control unit 1200, signal processing similar to the control unit 1100 in Example 9 is performed, and information of $s_i^z$ advanced by 1 step is sent to the buffer array 1210. This is processing of 1 step and this processing is repeated from $t=t_0$ to $t=\tau$.

$s_i^z$ is a continuous quantity and respective cells of the buffer arrays 1210 and 1230 with respect to $s_i^z$ are configured with multi-bits and are assumed as a pseudo-continuous quantity.

Effect of the temperature in the present invention is estimated as follows. Bit manipulation is performed in the LED (LD) array 1110, the polarized wave modulator 1112, and the buffer arrays 1210 and 1230. A voltage needed for bit inversion is about 1V. If it is assumed that e is the elementary charge and $k_B$ is the Boltzmann constant, a conversion temperature is $T=\sim1.2\times10^4$K by $T=eV/k_B$. This value is sufficiently larger than a room temperature of 300K, an influence of the temperature can be ignored in the configuration as in Examples 9 to 12, and it can be operated in the room temperature.

The present invention is not limited to the embodiments described above and includes various modifications. For example, it is possible to replace a portion of a configuration of an example with a configuration of another example and also, it is possible to add a configuration of another example to a configuration of a certain example. Also, it is possible to add, delete, and replace of a configuration of another example, with respect to a portion of a configuration of a certain example.

INDUSTRIAL APPLICABILITY

For example, it is available to a field of a computer for dealing with a problem to be solved that needs exhaustive search.

REFERENCE SIGNS LIST 100 procedure
201 main storage device
202 computing device
203 control device
204 auxiliary storage device
205 input device
206 output device
1000 local field response computing device
1100 control unit
1110 LED (LD) array
1111 LD
1112 polarized wave modulator
1113 polarization separator
1115 demultiplexer
1120 variable mask (variable attenuator)
1125 multiplexer
1130 detector array
1131 differential amplifier
1200 control unit
1210 buffer array
1220 computing unit
1221 memory
1230 buffer array

The invention claimed is:

1. A computer that includes a computing unit, a storing unit, and a control unit and performs computation while exchanging data between the storing unit and the computing unit by control of the control unit,
wherein N variables $s_j^z$ (j=1, 2, . . . , N) take a range of $-1 \leq s_j^z \leq 1$ and a problem to be solved is set using a local field $g_j$ and intervariable interaction $J_{ij}$ (i, j=1, 2, . . . , N),
in the computing unit, computation is discretely performed from $t=t_0$ ($t_0=0$) to $t_m$ ($t_m=\tau$) by dividing time into m timepieces,
$B_j^z(t_k)=\{\Sigma_i J_{ij} s_i^z(t_{k-1})+g_j+\text{sgn}(s_j^z(t_{k-1}))\cdot g_{pina}\}\cdot t_k/\tau$ or $B_j^z(t_k)=\{\Sigma_i J_{ij} s_i^z(t_{k-1})+g_j+g_{pinb}\cdot s_j^z(t_{k-1})\}\cdot t_k/\tau$ is obtained by using a value of a variable $s_i^z(t_{k-1})$ (i=1, 2, . . . , N) of previous time $t_{k-1}$ and a coefficient $g_{pina}$ or $g_{pinb}$ of a relaxation term each time when the variable $s_j^z(t_k)$ is obtained at each time $t_k$, and a function f is determined so as to cause the range of the variable $s_j^z(t_k)$ to become $-1 \leq s_j^z(t_k) \leq 1$ and results in $s_j^z(t_k)=f(B_j^z(t_k), t_k)$,
the variable $s_j^z$ is caused to approach $-1$ or 1 by making a time step advance from $t=t_0$ to $t=t_m$, and
finally determines a solution in such a way that if $s_j^z<0$, then $s_j^{zd}=-1$ and otherwise, if $s_j^z>0$, then $s_j^{zd}=1$.

2. The computer according to claim 1,
wherein regarding the function f,
it is assumed that $B_j^x(t_k)=\gamma(1-t_k/\tau)$ using a certain constant $\gamma$, $\theta$ is defined by $\tan\theta=B_j^z(t_k)/B_j^x(t_k)$, the $s_j^z(t_k)$ is determined by $s_j^z(t_k)=\sin\theta$, and accordingly, the function f becomes $f(B_j^z(t_k), t_k)=\sin(\arctan(B_j^z(t_k)/B_j^x(t_k)))$.

3. The computer according to claim 1,
wherein correction parameters $r_s$ and $r_B$ are added to the function f, $\theta$ is defined by $\tan\theta=r_B\cdot B_j^z(t_k)/B_j^x(t_k)$, the $s_j^z(t_k)$ is determined by $s_j^z(t_k)=r_s\cdot\sin\theta$, and accordingly, the function f becomes $f(B_j^z(t_k), t_k)=r_s\cdot\sin(\arctan(r_B\cdot B_j^z(t_k)/B_j^x((t_k))))$.

4. The computer according to claim 3,
wherein the correction parameters $r_s$ and $r_B$ are caused to depend on the $t_k$ and $B_j^z(t_k)$.

5. The computer according to claim 1,
wherein by assuming that at each time $t_k$, if $s_j^z(t_k)<0$, then $s_j^{zd}(t_k)=-1$, and otherwise, if $s_j^z(t_k)>0$, then $s_j^{zd}(t_k)=1$, $H_p(t_k)=-\Sigma_{i>j}J_{ij}s_i^{zd}(t_k)s_j^{zd}(t_k)-\Sigma_j g_j s_j^{zd}(t_k)$ is calculated at each time $t_k$, and $s_j^{zd}(t_k')$ at time $t_k'$ at which $H_p(t_k)$ became the minimum value is assumed as a final solution.

6. The computer according to claim 1,
wherein the coefficient $g_{pina}$ is a value from 1% to 50% of an average value of $|J_{ij}|$.

7. The computer according to claim 1,
wherein regarding a local field $g_j$ (j=1, 2, . . . , N) for setting of the problem to be solved,
if a component of $g_j \neq 0$ is present, the $B_j^z(t_k)$ described above is determined by $B_j^z(t_k)=\{\Sigma_i J_{ij} s_i^z(t_{k-1})+g_j\}\cdot t_k/\tau$, and if $g_j=0$ in all of N, the $B_j^z(t_k)$ described above is determined by $B_j^z(t_k)=\{\Sigma_i J_{ij} s_i^z(t_{k-1})+\text{sgn}(s_j^z(t_{k-1}))\cdot g_{pina}\}\cdot t_k/\tau$ or $B_j^z(t_k)=\{\Sigma_i J_{ij} s_i^z(t_{k-1})+g_j+g_{pinb}\cdot s_j^z(t_{k-1})\}\cdot t_k/\Sigma$.

8. A computing program that is executed by a computing unit,
wherein N variables $s_j^z$ (j=1, 2, . . . , N) take a range of $-1 \leq s_j^z \leq 1$ and a problem to be solved is set using a local field $g_j$ and intervariable interaction $J_{ij}$ (i, j=1, 2, . . . , N),
computation is discretely performed from $t=t_0$ ($t_0=0$) to $t_m$ ($t_m=\tau$) by dividing time into m timepieces,
$B_j^z(t_k)=\{\Sigma_i J_{ij} s_i^z(t_{k-1})+g_j+\text{sgn}(s_j^z(t_{k-1}))\cdot g_{pina}\}\cdot t_k/\tau$ or $B_j^z(t_k)=\{\Sigma_i J_{ij} s_i^z(t_{k-1})+g_j+g_{pinb}\cdot s_j^z(t_{k-1})\}\cdot t_k/\tau$ is obtained by using a value of a variable $s_i^z(t_{k-1})$ (i=1, 2, . . . , N) of previous time $t_{k-1}$ and a coefficient $g_{pina}$ or $g_{pinb}$ of a relaxation term each time when the variable $s_j^z(t_k)$ is obtained at each time $t_k$, and a function f is determined so as to cause the range of the variable $s_j^z(t_k)$ to become $-1 \leq s_j^z(t_k) \leq 1$ and results in $s_j^z(t_k)=f(B_j^z(t_k), t_k)$,
the variable $s_j^z$ is caused to approach $-1$ or 1 by making a time step advance from $t=t_0$ to $t=t_m$, and
finally determines a solution in such a way that if $s_j^z<0$, then $s_j^{zd}=-1$ and otherwise, if $s_j^z>0$, then $s_j^{zd}=1$.

9. The computing program according to claim 8,
wherein regarding the function f,
it is assumed that $B_j^x(t_k)=\gamma(1-t_k/\tau)$ using a certain constant $\gamma$, $\theta$ is defined by $\tan\theta=B_j^z(t_k)/B_j^x(t_k)$, the $s_j^z(t_k)$ is determined by $s_j^z(t_k)=\sin\theta$, and accordingly, the function f becomes $f(B_j^z(t_k), t_k)=\sin(\arctan(B_j^z(t_k)/B_j^z(t_k)))$.

10. The computing program according to claim 8,
wherein correction parameters $r_s$ and $r_B$ are added to the function f, $\theta$ is defined by $\tan\theta=r_B\cdot B_j^z(t_k)/B_j^x(t_k)$, the $s_j^z(t_k)$ is determined by $s_j^z(t_k)=r_s\cdot\sin\theta$, and accordingly, the function f becomes $f(B_j^z(t_k), t_k)=r_s\cdot\sin(\arctan(r_B\cdot B_j^z(t_k)/B_j^x(t_k)))$.

11. The computing program according to claim 10,
wherein the correction parameters $r_s$ and $r_B$ are caused to depend on the $t_k$ and $B_j^z(t_k)$.

12. The computing program according to claim 8,
wherein by assuming that at each time $t_k$, if $s_j^z(t_k)<0$, then $s_j^{zd}(t_k)=-1$, and otherwise, if $s_j^z(t_k)>0$, then $s_j^{zd}(t_k)=1$, $H_p(t_k)=-\Sigma_{i>j}J_{ij}s_i^{zd}(t_k)s_j^{zd}(t_k)-\Sigma_j g_j s_j^{zd}(t_k)$ is calculated at each time $t_k$, and $s_j^{zd}(t_k')$ at time $t_k'$ at which $H_p(t_k)$ became the minimum value is assumed as a final solution.

13. The computing program according to claim 8,
wherein the coefficient $g_{pina}$ is a value from 1% to 50% of an average value of $|J_{ij}|$.

14. The computing program according to claim 8,
wherein regarding a local field $g_j$ (i, j=1, 2, ..., N) for setting of the problem to be solved, if a component of $g_j \neq 0$ is present, the $B_j^z(t_k)$ described above is determined by $B_j^z(t_k) = \{\Sigma_i J_{ij} s_i^z(t_{k-1}) + g_j\} \cdot t_k/\tau$, and if $g_j = 0$ in all of N, the $B_j^z(t_k)$ described above is determined by $B_j^z(t_k) = \{\Sigma_i J_{ij} s_i^z(t_{k-1}) + \text{sgn}(s_j^z(t_{k-1})) \cdot g_{pina}\} \cdot t_k/\tau$ or $B_j^z(t_k) = \{\Sigma_i J_{ij} s_i^z(t_{k-1}) + g_{pinb} \cdot s_j^z(t_{k-1})\} \cdot t_k/\tau$.

15. A computer that includes a computing unit, a storing unit, and a control unit and performs computation while exchanging data between the storing unit and the computing unit by control of the control unit, the computer comprising:

a local field response computing device, wherein in the local field response computing device, N variables $s_j^z$ (j=1, 2, ..., N) take a range of $-1 \leq s_j^z \leq 1$ and a problem to be solved is set using a local field $g_j$ and intervariable interaction $J_{ij}$ (i, j=1, 2, ..., N), in the computing unit, computation is discretely performed from $t = t_0$ ($t_0 = 0$) to $t_m$ ($t_m = \tau$) by dividing time into m timepieces, $B_j^z(t_k) = \{\Sigma_i J_{ij} s_i^z(t_{k-1}) + g_j + \text{sgn}(s_j^z(t_{k-1})) \cdot g_{pina}\} \cdot t_k/\Sigma$ or $B_j^z(t_k) = \{\Sigma_i J_{ij} s_i^z(t_{k-1}) + g_j + g_{pinb} \cdot s_j^z(t_{k-1})\} \cdot t_k/\tau$ is obtained by using a value of a variable $s_i^z(t_{k-1})$ (i=1, 2, ..., N) of previous time $t_{k-1}$ and a coefficient $g_{pina}$ or $g_{pinb}$ of a relaxation term each time when the variable $s_j^z(t_k)$ is obtained at each time $t_k$, and a function f is determined so as to cause the range of the variable $s_j^z(t_k)$ to become $-1 \leq s_j^z(t_k) \leq 1$ and results in $s_j^z(t_k) = f(B_j^z(t_k), t_k)$, the variable $s_j^z$ is caused to approach $-1$ or $1$ by making a time step advance from $t = t_0$ to $t = t_m$, finally determines a solution in such a way that if $s_j^z < 0$, then $s_j^{zd} = -1$ and otherwise, if $s_j^z > 0$, then $s_j^{zd} = 1$, and processing in the local field response computing device is performed by using modulation of a plurality of optical signals parallely processed in an optical system or by parallely processing data accumulated in a buffer array.

* * * * *